United States Patent
Koizumi et al.

(10) Patent No.: US 8,323,081 B2
(45) Date of Patent: Dec. 4, 2012

(54) POSITIONING SYSTEM, AIR CONDITIONING SYSTEM, AND LIGHTING SYSTEM

(75) Inventors: Yoshiaki Koizumi, Chiyoda-ku (JP); Naoyuki Hibara, Chiyoda-ku (JP); Toshiyasu Higuma, Chiyoda-ku (JP); Noriyuki Kushiro, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 235 days.

(21) Appl. No.: 12/677,940

(22) PCT Filed: Jan. 21, 2008

(86) PCT No.: PCT/JP2008/050674
§ 371 (c)(1),
(2), (4) Date: Mar. 12, 2010

(87) PCT Pub. No.: WO2009/034720
PCT Pub. Date: Mar. 19, 2009

(65) Prior Publication Data
US 2010/0225540 A1 Sep. 9, 2010

(30) Foreign Application Priority Data
Sep. 14, 2007 (JP) .................................. 2007-239594

(51) Int. Cl.
*F24F 7/007* (2006.01)
*G01S 5/14* (2006.01)
(52) U.S. Cl. ...................... 454/258; 236/49.3; 342/458
(58) Field of Classification Search .................. 454/258, 454/358; 236/49.3; 342/458, 463, 464
See application file for complete search history.

(56) References Cited

U.S. PATENT DOCUMENTS

| 5,180,333 | A | * | 1/1993 | Shyu | 454/319 |
| 5,272,477 | A | * | 12/1993 | Tashima et al. | 340/870.16 |
| 5,326,028 | A | * | 7/1994 | Kano et al. | 236/49.3 |
| 5,504,477 | A | * | 4/1996 | Whitright et al. | 340/10.4 |
| 5,666,662 | A | * | 9/1997 | Shibuya | 455/456.4 |
| 7,012,521 | B2 | * | 3/2006 | Fardin et al. | 340/539.13 |
| 2006/0071780 | A1 | * | 4/2006 | McFarland | 340/539.2 |

FOREIGN PATENT DOCUMENTS

| CN | 1 889 614 A | 1/2007 |
| EP | 2 056 534 A1 | 5/2009 |
| JP | 60-159547 A | 8/1985 |
| JP | 63-231134 A | 9/1988 |

(Continued)

OTHER PUBLICATIONS

Anjum, F. et al, "Secure Localization in Sensor Networks Using Transmission Range Variation," IEEE MASS 2005 Workshop, pp. 1-9.*

(Continued)

*Primary Examiner* — Gregory C Issing
(74) *Attorney, Agent, or Firm* — Buchanan Ingersoll & Rooney PC

(57) ABSTRACT

To provide a positioning system that clearly defines a disposition of a base station for identifying a position of a radio set. While a wireless base station 1 that transmits and receives a distance-measuring signal to and from a terminal 2 to be measured by wireless communication is disposed at each corner forming an equilateral triangular, the length of each side of the equilateral triangle is made to be a maximum communication distance of the wireless base station 1.

10 Claims, 11 Drawing Sheets

FOREIGN PATENT DOCUMENTS

| | | |
|---|---|---|
| JP | 64-82827 A | 3/1989 |
| JP | 1-233930 A | 9/1989 |
| JP | 7-38948 A | 2/1995 |
| JP | 2001-304653 A | 10/2001 |
| JP | 2003-219485 A | 7/2003 |
| JP | 2003 248045 A | 9/2003 |
| JP | 2004-258009 A | 9/2004 |
| JP | 2005 241208 A | 9/2005 |
| JP | 2006084150 A * | 3/2006 |
| JP | 2006-217390 A | 8/2006 |
| JP | 2007-127348 A | 5/2007 |

OTHER PUBLICATIONS

International Search Report for PCT/JP2008/050674 completed Apr. 1, 2008.

Official Action issued by the Japanese Patent Office on Jan. 31, 2012 in corresponding Japanese Patent Application No. 2009-532067, and English language translation of the Official Action.

Gunnarsson, F. et al., "Mobile Positioning Using Wireless Networks", IEEE Signal Processing Magazine, vol. 22, No. 4, pp. 41-53, XP011135193 (Jul. 1, 2005).

Supplementary European Search Report dated Jun. 5, 2012, issued in corresponding European Patent Application No. 08703524.2-2220/ 2189803. (12 pages).

Office Action from Chinese Patent Office dated Jul. 12, 2012, issued in corresponding Chinese Patent Application No. 200880106979.3, with an English translation thereof.

Office Action from Japanese Patent Office dated Sep. 4, 2012, issued in corresponding Japanese Patent Application No. 2009-532067, with an English translation thereof.

* cited by examiner

POSITIONING SYSTEM, AIR CONDITIONING SYSTEM, AND LIGHTING SYSTEM

TECHNICAL FIELD

The present invention relates to a positioning system for measuring a position of a terminal to be measured by a wireless signal, an air conditioning system and a lighting system using the positioning system.

BACKGROUND ART

Conventionally, regarding a ranging system using wireless communication, as a technique for the purpose of "transmitting and receiving packets between a source and a recipient and ranging and positioning using its respondent procedure", such a system is proposed that "when a radio set 1 transmits a packet to a radio set 2, a communication partner, the radio set 2 transmits a packet without fail after an elapse of an integral multiple of a unit time from the time of a packet detection. The radio set 1 measures the time from the transmission of the packet by itself to the packet detection of the radio set 2 using a counter. Then, converting the time subtracting the time from the packet detection of the radio set 2 to the transmission and processing time of the radio set 1 itself from a measurement time into a propagation distance to the radio set 2, a communication partner, to achieve ranging". (Patent Document 1)

As a technique with a purpose such that "to provide a controller for a human body detection air-conditioning air nozzle capable of detecting a plurality of human bodies existing at arbitrary locations to fairly and efficiently supply an air-conditioned air is an object", it is proposed such that "An air-conditioned air nozzle 1 sends an air-conditioned air to an arbitrary direction with a variable rotation angle in both forward and reverse directions. Human body detection sensors 2*a* to 2*n* are disposed in order that surround the above by dividing a circumference into the plural without overlapping a detection area. Then, a controller for a human body detection air-conditioned air nozzle can be obtained capable of fairly and efficiently supplying an air-conditioned air to various human body existing conditions by a controller collectively processing signals from these sensors." (Patent Document 2)

As a technique with a purpose such as "to provide an equipment management apparatus for automatically detecting partitions even if there is any and automatically setting a candidate for an equipment management group in consideration of the partition upon detecting it", such an apparatus is proposed that is "provided with position calculation means 22 for calculating each position of each equipment 10 based on a mutual measurement distance of a plurality of equipment 10, cover assumption means 23 for calculating a distance between each equipment based on the position of each equipment 10 calculated by position calculation means 22 to assume a position of a cover wall based on an error between the calculation distance and measurement distance between each equipment, and operation setting reasoning means 28 for setting a candidate of an operation group based on a position of each equipment 10 derived by cover assumption means 23 and an assumed position of the wall." (Patent Document 3)

Patent Document 1 Japanese Unexamined Patent Application Publication No. 2004-258009
Patent Document 2 Japanese Unexamined Patent Application Publication No. 2001-304653
Patent Document 3 Japanese Unexamined Patent Application Publication No. 2006-217390

DISCLOSURE OF THE INVENTION

Problems to be Solved by the Invention

With the technique according to the above Patent Document 1, no definition is clearly provided for an optimal disposition location of a base station for identifying the position of a radio set. In other words, a disposition of the base station is not definite that can cover a maximum location detectable area with a minimum number of the base station.

As a result, in equipment installation for installing the base station, it is necessary to obtain an installation location of the base station for appropriately detecting the position of a radio set to be measured by trial and error.

In the technique according to the above Patent Document 2, a plurality of human body detection sensors is necessary on the air-conditioner side.

The human body detection sensor cannot read control information except a position such as temperature and humidity, so that an air-conditioner control to suit preferences of users is not possible.

In the technique according to the above Patent Document 3, there is a description to allocate an address to each equipment 10. (For example, paragraphs [0022] to [0023])

The address mentioned here designates an identifier such as a network address, which is determined separately from position coordinates of each equipment 10. However, how to specify concrete values of the address of each equipment 10, that is an address system, is not clear.

The present invention is done to solve the above mentioned problems. The object is to provide a positioning system that clearly defines a disposition of a base station for identifying a position of a radio set.

Further, another object of the present invention is to provide an air-conditioning system and a lighting system for performing control to suit preferences of users toward a user position holding a radio set.

Means for Solving the Problems

A positioning system according to the present invention disposes a wireless base station that transmits and receives a positioning signal by wireless communication to and from a terminal to be measured, at each corner of a shape of an equilateral triangle and the length of each side of the equilateral triangle is made to be a maximum communication length of the wireless base station.

An air-conditioning system according to the present invention includes an air-conditioner, a terminal to be measured having a wireless communication function, wireless base stations that transmit and receive a positioning signal by wireless communication to and from the terminal to be measured. The wireless base stations measure each distance to the terminal to be measured to transmit measured distance data to the air-conditioner. The air conditioner calculates the position of the terminal to be measured based on the measured distance data to adjust a wind direction to the calculated position of terminal to be measured.

A lighting system according to the present invention includes a lighting instrument, a terminal to be measured having a wireless communication function, wireless base stations that transmit and receive a positioning signal by wireless communication to and from the terminal to be measured. The lighting instrument has means for setting a management area of the lighting instrument. The wireless base stations measure each distance to the terminal to be measured to transmit measured distance data to the lighting instrument. The lighting instrument calculates the position of the terminal to be measured based on the measured distance data to turn on when confirming that the terminal to be measured exists in the management area.

A positioning system according to the present invention includes a plurality of terminals to be measured having a wireless communication function, a wireless base station that performs wireless communication with the terminals to be measured. The wireless base station obtains a coordinates value of each position of the terminals to be measured to set the coordinates value as each address of the terminals to be measured.

Effect of the Invention

With a positioning system according to the present invention, the terminal to be measured in a triangle connecting wireless base stations can receive positioning signals from each wireless base station forming vertexes of the triangle, so that it is possible to precisely identify a position. A size of a positionable area can be maximized as well.

With an air-conditioning system according to the present invention, a spot air-conditioning can be achieved in which a position of a terminal to be measured is calculated based on the measured distance data transmitted by the wireless base stations and a wind direction of the air-conditioner is automatically adjusted to the position.

With a lighting system according to the present invention, a position of the terminal to be measured is calculated based on the measured distance data transmitted by the wireless base stations and the lighting instrument can be automatically turned on when the terminal to be measured enters into the management area.

With a positioning system according to the present invention, it is advantageous that since a coordinate value of the terminal to be measured is used as an address of the terminal to be measured, an address system becomes clear, each address of terminals to be measured can be regularly assigned, and an address management becomes easier.

Figure 1:
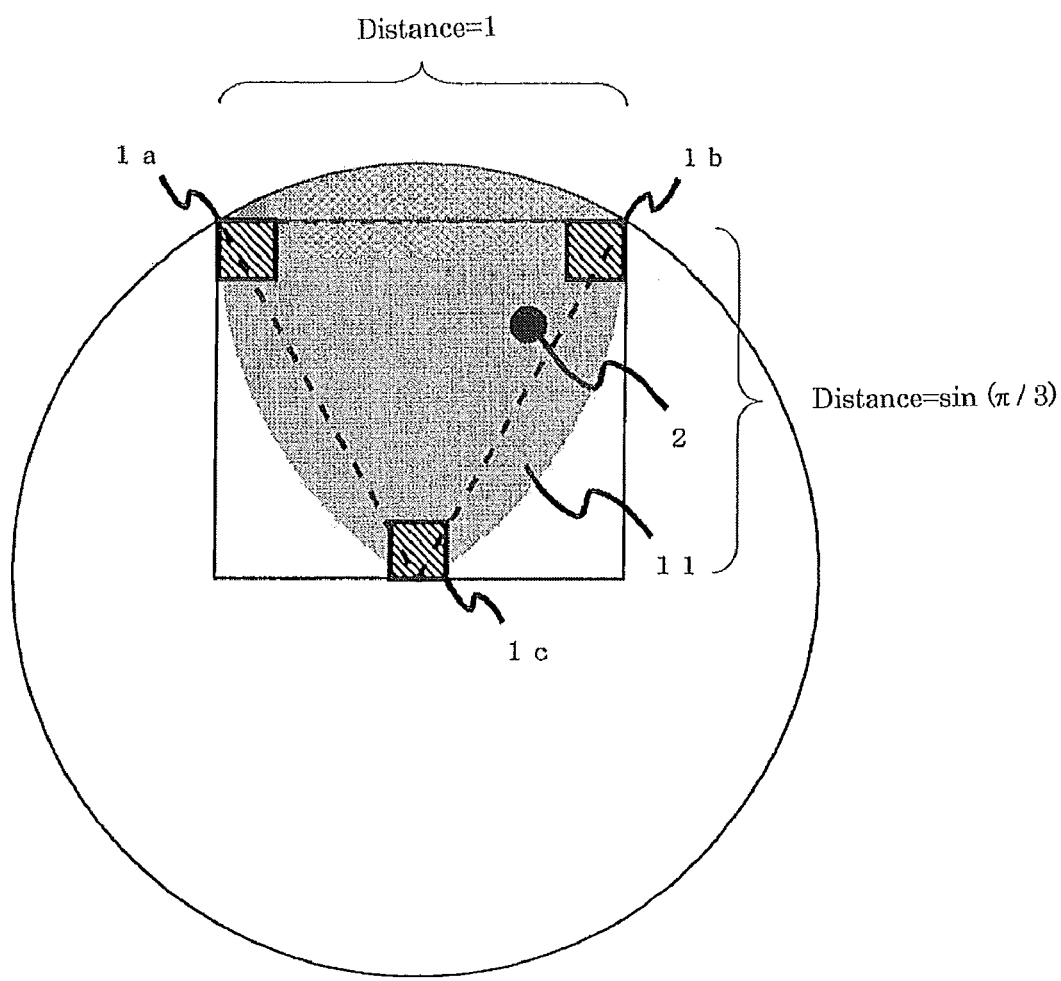
FIG. 1 shows a base station disposition of a positioning system according to Embodiment 1.

DESCRIPTIONS OF NUMERALS $1a$-$1e$ Wireless base station
2 Terminal to be measured
$2a$-$2c$ Terminal to be measured
3 Wireless communication part
4 Air-conditioner
5 Lighting instrument
6 Gateway
7 Network for air-conditioning
8 Network for lighting
12 Management area

PREFERRED EMBODIMENT OF THE INVENTION

Embodiment 1

FIG. 1 shows a base station disposition of a positioning system according to Embodiment 1. In FIG. 1, $1a$-$1c$ are wireless base stations and 2 is a terminal to be measured. Wireless base stations $1a$-$1c$ are disposed at each corner of a shape of an equilateral triangle. In the case of a large area such as a building, while partitioning into a quadrilateral area such that a longitudinal length becomes $\sin(\pi/3)$ against a horizontal length of 1, the wireless base stations are disposed at both corners of a side of a distance of 1 and one location at the center of an opposing side.

Each side of the equilateral triangle is made to be equal to a maximum communication length of each wireless base station $1a$ to $1c$. For example, when the maximum communication length of the wireless base station is 10 m, while making a quadrilateral of a width 10 m and height 8.7 m, wireless base stations are disposed at both corners of a side of 10 m and at a center of an opposing side.

When depicting a communicable area of the wireless base station $1c$ by a circle by equalizing a communicable distance of the wireless base station and the distance between wireless base stations, the circle shown in FIG. 1 is obtained.

When drawing a circle whose radius is equal to the communicable distance from each wireless base station, the overlapped area (a shaded area 11 in FIG. 1) of the circles becomes an area 1 where all three wireless base stations are communicable.

When the terminal 2 to be measured is disposed in the area 11, it is possible to accurately obtain the position of the terminal 2 to be measured.

It is possible to obtain a distance from each wireless base station 1a to 1c to the terminal 2 to be measured by, for example, a method disclosed in Patent Document 1. Accordingly, when positions of the wireless base stations 1a to 1c are defined, a relative position of the terminal 2 to be measured can be obtained based on distances from the three wireless base stations.

In addition, a specification of a communication method and the like of each wireless base station is appropriately determined according to an installation environment and the like.

Processing to calculate the position of terminal 2 to be measured based on the distance from the wireless base station may be performed by each wireless base station or transferred to other operational devices and the like.

Figure 2:
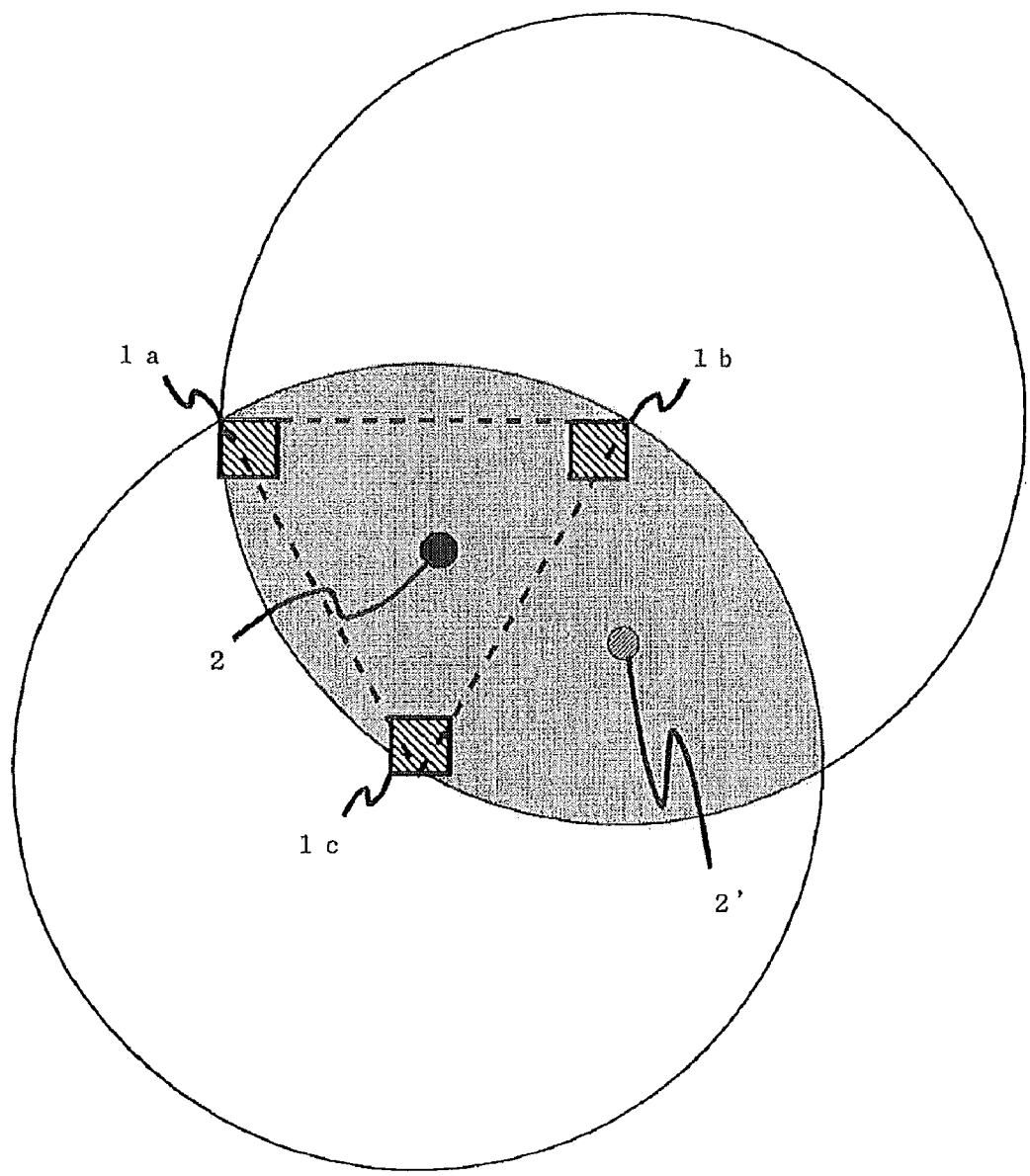
FIG. 2 illustrates an example assuming a position of a terminal 2 to be measured outside a communication range.

FIG. 2 illustrates an example assuming a position of a terminal 2 to be measured outside a communication range.

In FIG. 2, it is assumed that from a positioning signal from the wireless base stations 1b and 1c, the position of the terminal to be measured is either position 2 or position 2'.

Then, the wireless base station 1a tries to communicate with the terminal 2 to be measured and when the communication is impossible, it is possible to assume that the position of the terminal to be measured is outside the communication range of the wireless base station 1a, the position 2'.

Figure 3:
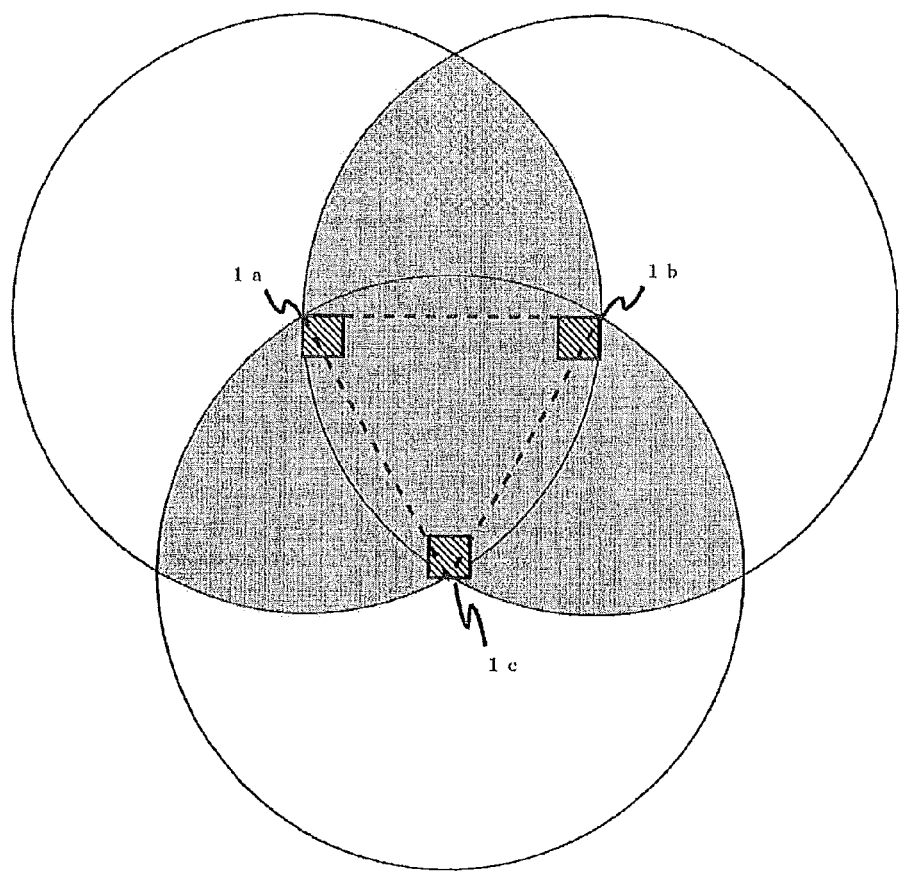
FIG. 3 shows a position-assumable area of the terminal 2 to be measured.

FIG. 3 shows a position-assumable area of the terminal 2 to be measured.

In consideration of items described in FIG. 2, it is found that the position of terminal 2 to be measured in a broader area than the area 1 described by FIG. 1. That is, it is possible to assume the position of terminal 2 to be measured if any two wireless base stations are a communicable area of wireless base stations 1a to 1c.

Accordingly, the shaded area shown in FIG. 3 becomes a position-assumable extent of the terminal 2 to be measured.

As mentioned above, according to Embodiment 1, by disposing the wireless base stations 1a to 1c at each corner of a shape of an equilateral triangle and by making each side of the equilateral triangle to be equal to a communicable distance of the wireless base station, a position-identifiable extent can be expanded in the three wireless base stations. Further, a position identification accuracy of the terminal 2 to be measured can be enhanced.

According to Embodiment 1, as described in FIGS. 2 and 3, it is possible to assume a position of the terminal 2 to be measured within a communicable extent of any two wireless base stations of the wireless base stations 1a to 1c, so that the position-assumable extent can be expanded.

Embodiment 2

Figure 4:
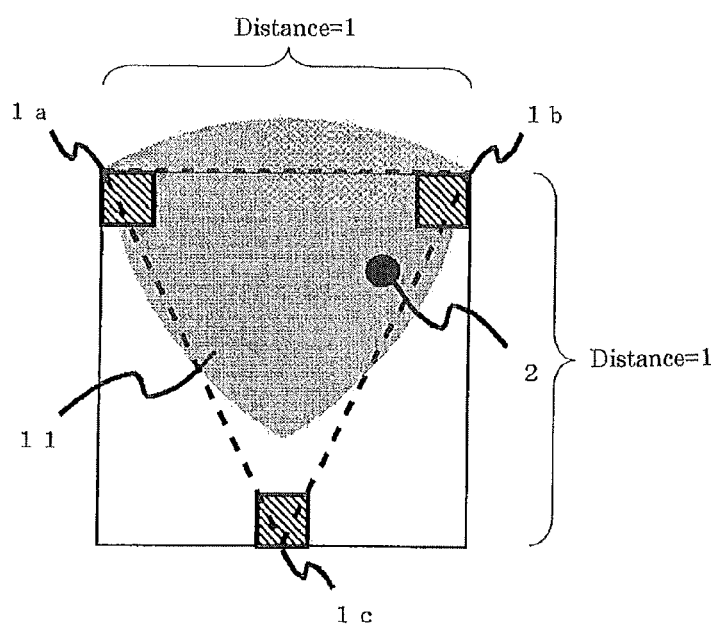
FIG. 4 shows a base station disposition of the positioning system according to Embodiment 2.

FIG. 4 shows a base station disposition of the positioning system according to Embodiment 2.

Each wireless base station 1a to 1c is disposed at each corner of a shape of an isosceles triangle. The height and the length of a bottom side of the isosceles triangle are made to be equal to the maximum communication distance of each wireless base station 1a to 1c.

Accordingly, each wireless base station 1a to 1c is disposed in such a way that two wireless base stations are disposed at both corners against an area partitioned into a square whose side length is a maximum communication distance of the wireless base station, and other wireless base station is disposed at the center of the opposing side.

In addition, an area 11 where position identification of the terminal 2 to be measured is possible is a shaded area in FIG. 4 and a little smaller than the area 11 explained in FIG. 1 of Embodiment 1. However, like an installation work at the time of installing a wireless base station in a large area such as a building, when partitioning of an area is required, the area may be partitioned in a square form, so that it is a merit that construction becomes simple and easy.

The distance of the wireless base stations 1a to 1c is almost the same as Embodiment 1 and position identification ability of the terminal 2 to be measured is kept at a close level to Embodiment 1.

Embodiment 3

Figure 5:
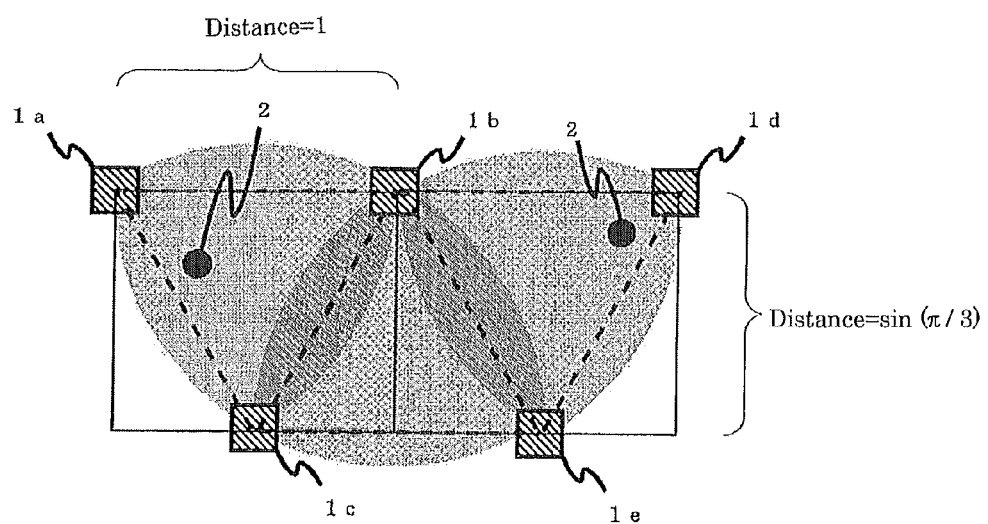
FIG. 5 shows a base station disposition of the positioning system according to Embodiment 3.

FIG. 5 shows a base station disposition of the positioning system according to Embodiment 3.

In FIG. 5, the wireless base stations 1a to 1e are continuously disposed so as to form three equilateral triangles.

Each side of the equilateral triangle is disposed so as to be equal to a maximum communication distance of each wireless base station 1a to 1e and one side of the equilateral triangle overlaps with any side of the other equilateral triangle.

In FIG. 5, an area where position identification of the terminal 2 to be measured is possible is a shaded area in the figure.

With a disposition of the wireless base station like FIG. 5, the position of the terminal 2 to be measured can be assumed with high precision in a wider area compared with the disposition of FIG. 1.

In FIG. 5, five wireless base stations 1a to 1e are disposed, however, the number of the wireless base station is not limited to five, but much more wireless base stations can be disposed.

Embodiment 4

Figure 6:
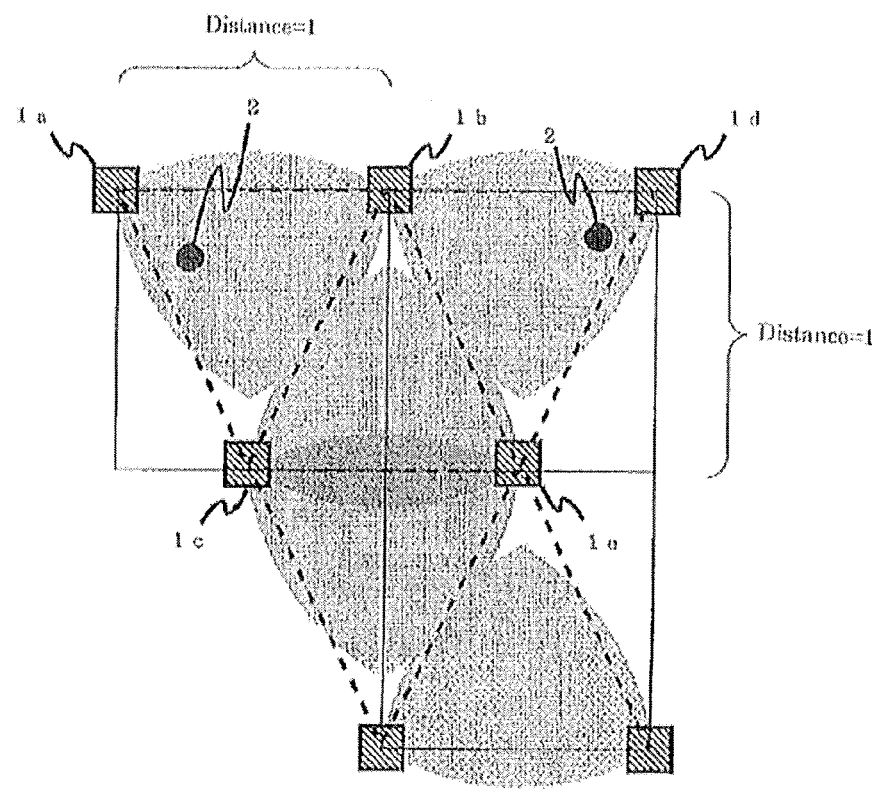
FIG. 6 shows a base station disposition of the positioning system according to Embodiment 4.

FIG. 6 shows a base station disposition of the positioning system according to Embodiment 4.

In FIG. 6, the wireless base stations 1a to 1e are continuously disposed so as to form three isosceles triangles.

The isosceles triangle is disposed in such a way that its height and length of its bottom side are equal to a maximum communication distance of each wireless base stations 1a to 1e and an oblique side and/or a bottom side of the isosceles triangle overlap with an oblique side and/or a bottom side of other isosceles triangles, respectively.

In FIG. 6, an area where position identification of the terminal 2 to be measured is possible is a shaded area in the figure.

With a disposition of the wireless base station like FIG. 6, the position of the terminal 2 to be measured can be assumed with high precision in a wider area compared with the disposition of FIG. 4.

In Embodiment 4, descriptions are given to the disposition of five wireless base stations 1a to 1e, however, the number of the wireless base station is not limited to five, but much more wireless base stations can be disposed as shown in FIG. 6.

When comparing a disposition of FIG. 5 described in Embodiment 3 with that of FIG. 6 described in Embodiment 4, the disposition of FIG. 5 has to partition the area by $\sin(\pi/3)$ in height against 1 in width and it takes time for installation of the wireless base station. On the other hand, the disposition of FIG. 6 has an advantage that installation is simple because the area may be partitioned in a square form.

When compared with the disposition of FIG. 5, an area where position identification of the terminal 2 to be measured is possible becomes a little smaller, however, the distance of the wireless base stations 1a to 1e is almost the same as Embodiment 3 and a position identification ability of the terminal 2 to be measured is kept at a close level to Embodiment 3.

Embodiment 5

Figure 7:
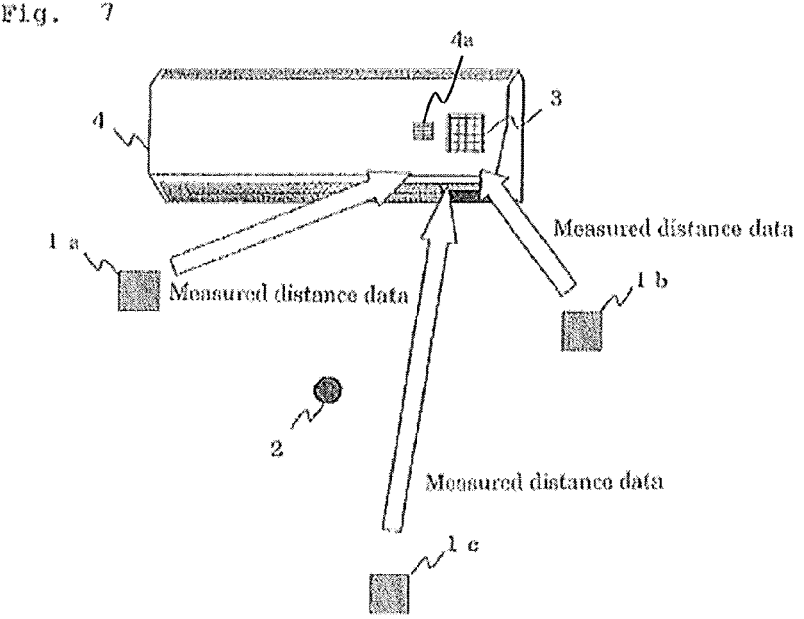
FIG. 7 is a configuration diagram of an air-conditioning system according to Embodiment 5.

FIG. 7 is a configuration diagram of an air-conditioning system according to Embodiment 5.

In FIG. 7, descriptions on the wireless base stations 1a to 1c and the terminal 2 to be measured are the same as Embodiments 1 to 4, so that they will be omitted. Disposition of the wireless base stations 1a to 1c may be what is described in Embodiments 1 to 4 or else a disposition can be used in which position identification of the terminal 2 to be measured is possible.

The air-conditioner 4 is provided with a wireless communication part 3 capable of performing wireless communication with wireless base stations 1a to 1c.

Wireless base stations 1a to is measure each distance to the terminal 2 to be measured respectively to transmit measured distance data to the wireless communication part 3.

The wireless communication part 3 receives the measured distance data transmitted by the wireless base stations 1a to 1c to deliver them to an operation part such as a CPU and microcomputer built-in in the air-conditioner 4.

The operation part calculates the position of the terminal 2 to be measured based on the received measured distance data and position information of each wireless base station 1a to 1c.

Next, the operation part controls each working part of the air-conditioner so that a wind direction is adjusted in accordance with the calculated position of the terminal 2 to be measured. Thereby, a function of a spot air-conditioning can be achieved.

A communication method and the like of the communication part 3 are appropriately determined in accordance with specifications and the like of the wireless base stations 1a to 1c.

As mentioned above, according to Embodiment 5, a spot air-conditioning can be obtained such that the position of the terminal 2 to be measured is calculated based on the measured distance data transmitted by wireless base stations 1a to 1c and the wind direction of the air-conditioner 4 is automatically adjusted to the position.

Thereby, a function can be obtained such that the wind direction can be automatically adjusted toward, for example, a user having the terminal 2 to be measured.

Embodiment 6

Figure 8:
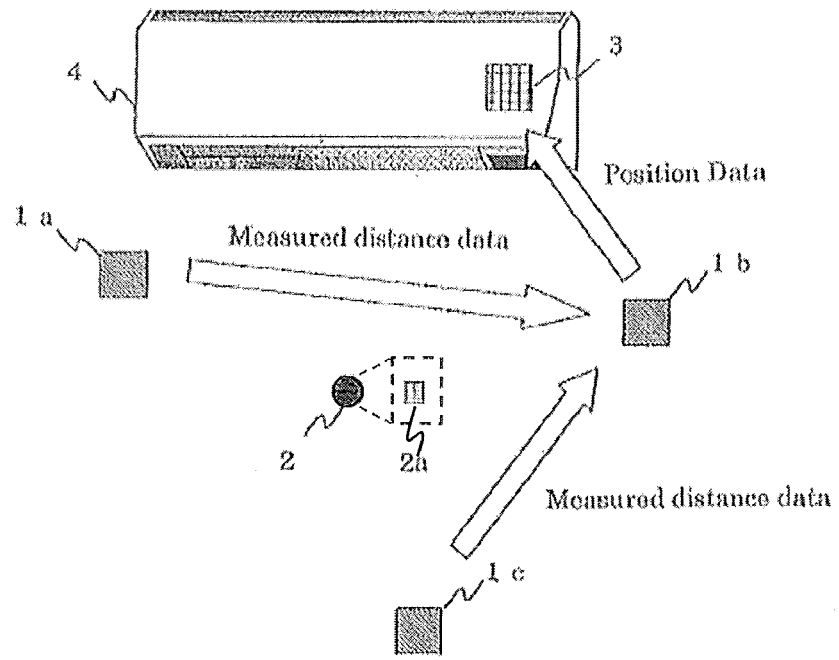
FIG. 8 is a configuration diagram of the air-conditioning system according to Embodiment 6.

FIG. 8 is a configuration diagram of the air-conditioning system according to Embodiment 6.

In FIG. 8, the wireless base stations 1a to 1c measure each distance to the terminal 2 to be measured, respectively. The wireless base stations 1a and 1c transmit their measured distance data to the wireless base station 1b.

The wireless base station 1b calculates the position of the terminal 2 to be measured based on each measured distance data and position information of each wireless base stations 1a to 1c to transmit calculated position data to the wireless communication part 3.

Thereafter, the air-conditioner 4 provides the spot air-conditioning function like Embodiment 5.

As for other configurations and the like, they are the same as Embodiment 5.

In addition, in FIG. 8, the wireless base station 1b calculates the position of the terminal 2 to be measured, however, it is not limited thereto, and which wireless base station calculates the position can be appropriately determined.

As mentioned above, in Embodiment 6, since the wireless base station 1b calculates the position of the terminal 2 to be measured, a calculation load of the operation part of the air-conditioner 4 is reduced, so that the air-conditioner 4 can be constituted at a lower cost compared with Embodiment 5.

Embodiment 7

Figure 9:
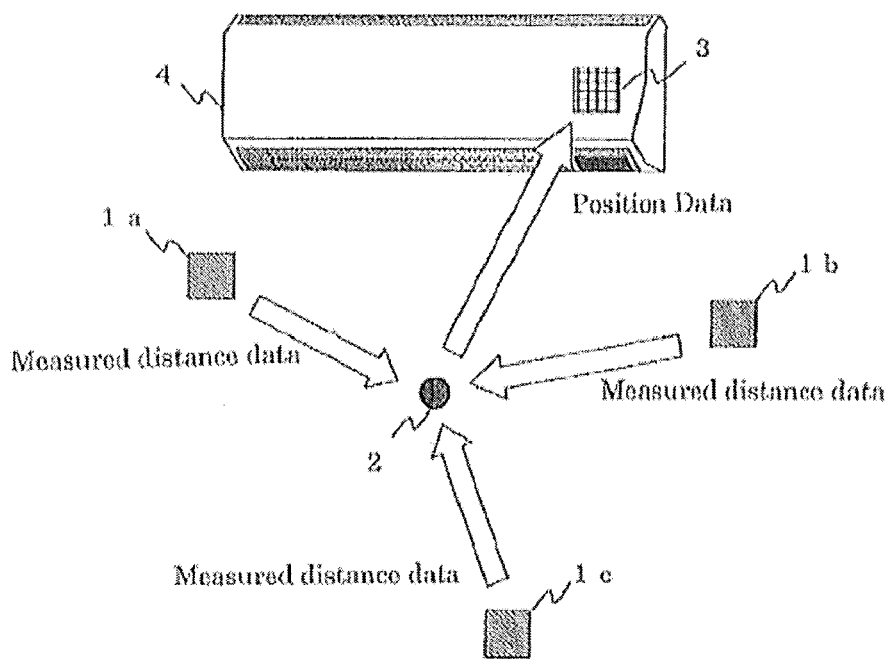
FIG. 9 is a configuration diagram of the air-conditioning system according to Embodiment 7.

FIG. 9 is a configuration diagram of the air-conditioning system according to Embodiment 7.

In FIG. 9, the wireless base stations 1a to 1c measure each distance to the terminal 2 to be measured respectively to transmit measured distance data to the terminal 2 to be measured.

The terminal 2 to be measured calculates the position of the terminal 2 to be measured based on each measured distance data and position information of each wireless base station 1a to 1c to transmit calculated position data to the wireless communication part 3.

Thereafter, the air-conditioner 4 provides the spot air-conditioning function like Embodiment 5.

As for other configurations and the like, they are the same as Embodiment 5.

As mentioned above, in Embodiment 7, since the terminal 2 to be measured calculates a self position, the calculation load of the operation part of the air-conditioner 4 is reduced, so that the air-conditioner 4 can be constituted at a lower cost compared with Embodiment 5.

In addition, unlike Embodiment 6, since specifications of each wireless base station can be the same, no need for considering the distance to the wireless communication part 3 and position regarding the disposition of each wireless base station, so that it is advantageous from the respect of simple installation and the like.

Embodiment 8

In Embodiments 5 to 7, descriptions are given to calculating the position of the terminal 2 to be measured and automatically adjusting the wind direction, however, when controlling the air-conditioner, besides adjusting the wind direction, controlling a cooling/heating operation mode and wind force, humidity and the like is conceivable as well.

In Embodiment 8, descriptions will be given to a control except for such wind direction adjustment.

In addition, the configuration of each equipment is almost the same as described in Embodiments 5 to 7, so that in Embodiment 8, different configurations from the above will be mainly explained.

In Embodiment 8, it is provided that the user operates the terminal 2 to be measured to set the temperature and wind force of the air-conditioner 4 to transmit the control information of the above.

In the descriptions below, from a viewpoint of a simple explanation, only a setting temperature is adopted as a control object of the air-conditioner and a configuration and operation example for performing a temperature control will be described.

Firstly, descriptions will be given to a configuration in which control information of the air conditioner 4 is transmitted by the terminal 2 to be measured.

The terminal 2 to be measured transmits control information (commands on such as cooling/heating mode and wind force) on the air-conditioner 4 to the air-conditioner 4. The air-conditioner 4 performs an air-conditioning operation according to the content of the control information toward the position of the terminal 2 to be measured.

Control information may be directly transmitted from the terminal 2 to be measured to the air-conditioner 4 (wireless communication part 3) or transmitted through any of the wireless base stations 1a to 1c. Thereby, using a communication method and communication means employed by transmission and reception of distance-measuring data and position data, there is no deed of installing a new communication part for transmitting and receiving control information, so that it is convenient.

Which communication method or communication means is used may be appropriately selected in accordance with the configuration of each equipment explained in Embodiments 5 to 7.

Next, descriptions will be given to a configuration for adjusting a temperature at the position of the terminal 2 to be measured. Two configurations (1) and (2) are conceivable as follows.

(1) A configuration in which the air-conditioner 4 is provided with a temperature sensor.

(2) A configuration in which the terminal 2 to be measured is provided with a temperature sensor.

(1) A configuration in which the air-conditioner 4 is provided with a temperature sensor When the air-conditioner 4 is provided with a temperature sensor 4a such as an infrared temperature sensor having a moving function (a function capable of controlling directions), a spot temperature adjusting function can be provided toward the position of the terminal 2 to be measured.

Firstly, the position of the terminal 2 to be measured is calculated by the method explained in Embodiments 5 to 7.

Next, the terminal 2 to be measured transmits setting temperature command data as control information to the air-conditioner 4.

The air-conditioner 4 measures the temperature at the position of the terminal 2 to be measured by the above-mentioned temperature sensor to perform a temperature adjustment by controlling each operation part so that the position becomes the set temperature. Prior art can be employed for a method for controlling each operation part.

(2) A configuration in which the terminal 2 to be measured is provided with a temperature sensor.

When the terminal 2 to be measured is provided with a temperature sensor 2a, it is possible to provide the spot temperature adjusting function toward the position of the terminal 2 to be measured.

Firstly, the position of the terminal 2 to be measured is calculated by the method explained in Embodiments 5 to 7.

Next, the terminal 2 to be measured transmits setting temperature command data as control information to the air-conditioner 4.

The terminal 2 to be measured transmits measurement results of the temperature sensor to the air-conditioner 4 on a regular basis.

The air-conditioner 4 performs temperature adjustment by controlling each operation part so that the position of the terminal 2 to be measured becomes the set temperature based on a difference between the setting temperature command received from the terminal 2 to be measured and measurement result of the temperature sensor. Prior art can be employed for a method for controlling each operation part.

In the above-mentioned (1) and (2), when transmitting the setting temperature command data and temperature measurement results from the terminal 2 to be measured, they may be transmitted directly to the air-conditioner 4 (wireless communication part 3) from the terminal 2 to be measured or through any of the wireless base stations 1a to 1c.

Which communication method or communication means is used may be appropriately selected in accordance with the configuration of each equipment explained in Embodiments 5 to 7.

In Embodiment 8, descriptions are given to transmitting control information from the terminal 2 to be measured, however, such a configuration is allowable in which control information is transmitted to the air-conditioner 4 by other means and an air-conditioning operation in accordance with the content of the control information is provided with the position of the terminal 2 to be measured.

Only an example of the temperature sensor is explained in the above, however, such a configuration is allowable in which the air-conditioner is controlled based on measurement results of a sensor measuring other physical quantities such as a humidity sensor to adjust the humidity of the position of the terminal 2 to be measured.

As mentioned above, according to Embodiment 8, it is possible to calculate the position of the terminal 2 to be measured based on the distance data measured by the wireless base stations 1a to 1c to provide an air-conditioning operation toward the position based on the control information commanded by the user in accordance with the content of the information.

In Embodiment 8, in a configuration in which the air-conditioner 4 has a temperature sensor, a spot temperature adjusting function can be provided toward the position of the terminal 2 to be measured.

In Embodiment 8, even in a configuration in which the terminal 2 to be measured has a temperature sensor, the spot temperature adjusting function can be provided toward the position of the terminal 2 to be measured as well. Further, no need of providing a temperature sensor in the air-conditioner 4, the air-conditioner 4 can be configured with a lower cost.

Embodiment 9

Figure 10:
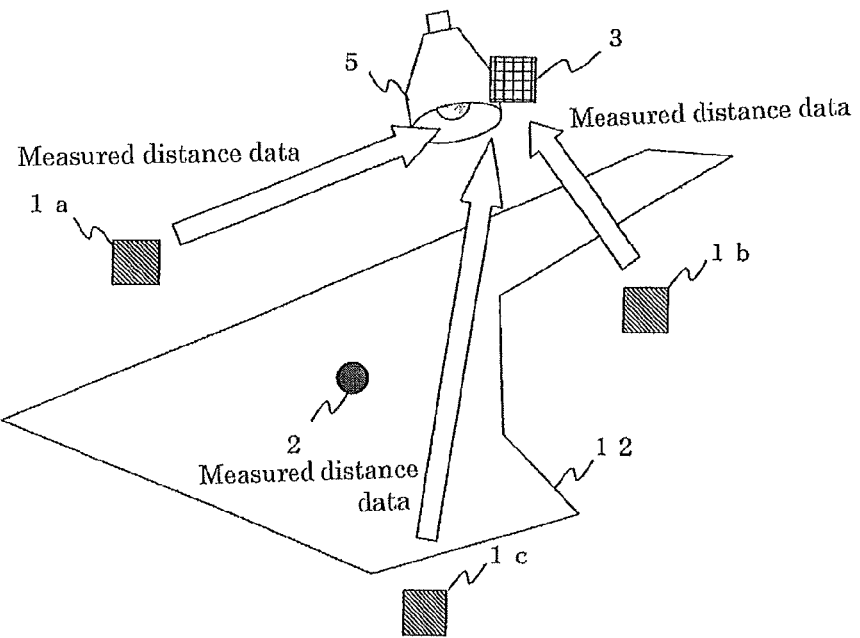
FIG. 10 is a configuration diagram of a lighting system according to Embodiment 9.

FIG. 10 is a configuration diagram of a lighting system according to Embodiment 9.

In FIG. 10, descriptions will be omitted for the wireless base stations 1a to 1c and the terminal 2 to be measured because they are the same as what is explained in FIG. 5. The wireless base stations 1a to 1c may be disposed in the same way as Embodiment 1 to 4, or else disposed in such a way that the position identification of the terminal 2 to be measured is possible.

A lighting instrument 5 is provided with a wireless communication part 3 capable of performing wireless communication with the wireless base stations 1a to 1c.

The lighting instrument 5 is provided with means for setting a management area 12.

The management area 12 specifies that the lighting instrument 5 be made to turn on when the terminal 2 to be measured enters into the area.

The management area 12 may be set using switches provided by the lighting instrument 5. The setting data of the management area 12 may be delivered by a memory device such as a flush memory. An arbitrary communication means may be configured for the setting.

Each wireless base station 1a to 1c measures each distance to the terminal 2 to be measured to transmit measured distance data to the wireless communication part 3.

The wireless communication part 3 receives the measured distance data transmitted by the wireless base stations 1a to 1c to deliver them to an operation part such as a CPU and microcomputer built-in in the lighting instrument 5.

The operation part calculates the position of the terminal 2 to be measured based on the received measured distance data and position information of each wireless base station 1a to 1c.

Next, the operation part decides whether the calculated position of the terminal 2 to be measured is within the management area 12. When it is decided that the terminal 2 to be measured enters the management area 12, the operation part controls each working part so as to make the lighting instrument 5 turn on.

In addition, it is provided that the communication method and the like of the communication part 3 is appropriately specified in accordance with specifications of the wireless base stations 1a to 1c.

When the lighting instrument 5 is provided with means capable of changing a lighting direction through means such as to change a light radiation direction of the lighting and to rotate the lighting instrument 5 itself, it can be configured so as to automatically turn the lighting toward the position of the terminal 2 to be measured.

Such a lighting operation following the position of the terminal 2 to be measured may be performed only within the management area 12, or in all areas where position identification of the terminal 2 to be measured is possible.

As mentioned above, according to Embodiment 9, the position of the terminal 2 to be measured is calculated based on the measured distance data transmitted by the wireless base stations 1a to 1c, and when the terminal 2 to be measured enters the management area 12, it is possible to automatically turn on the lighting instrument 5.

Using a lighting system provided with such a positioning function, a detection area of the lighting instrument 5 can be freely set, so that the lighting instrument 5 may be turned on in advance even when there is a wall interrupting infrared rays compared with a conventional method of detecting a human by infrared rays.

Thereby, for example, such a function is feasible as to turn on a light in a room before opening a door of the room.

Embodiment 10

Figure 11:
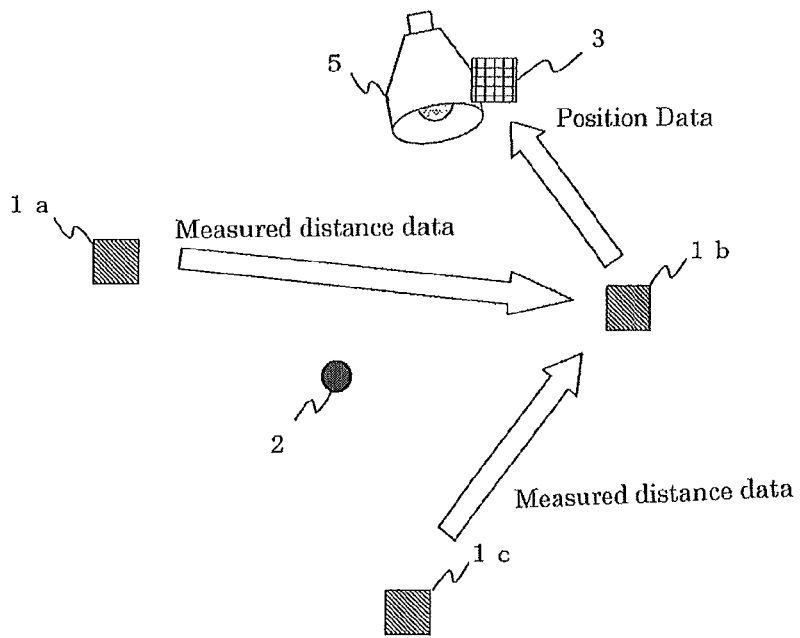
FIG. 11 is a configuration diagram of a lighting system according to Embodiment 10.

FIG. 11 is a configuration diagram of a lighting system according to Embodiment 10.

In FIG. 11, the wireless base stations 1a to 1c measure each distance to the terminal 2 to be measured, respectively. The wireless base stations 1a and 1c transmit measured distance data to the wireless base station 1b.

The wireless base station 1b calculates the position of the terminal 2 to be measured based on each measured distance data and position information of each wireless base station 1a to 1c to transmit calculated position data to the wireless communication part 3.

Thereafter, like Embodiment 9, the lighting instrument 5 provides the lighting.

As for other configurations and the like, they are the same as Embodiment 9.

In addition, in FIG. 11, it is provided that the wireless base station 1b calculates the position of the terminal 2 to be measured, however, it is not limited thereto, and it may be appropriately determined which wireless base station performs calculation.

As mentioned above, according to Embodiment 10, since the wireless base station 1b calculates the position of the terminal 2 to be measured, a calculation load of the operation part of the lighting instrument 5 is reduced and the lighting instrument 5 can be configured at a lower cost compared with Embodiment 9.

Embodiment 11

Figure 12:
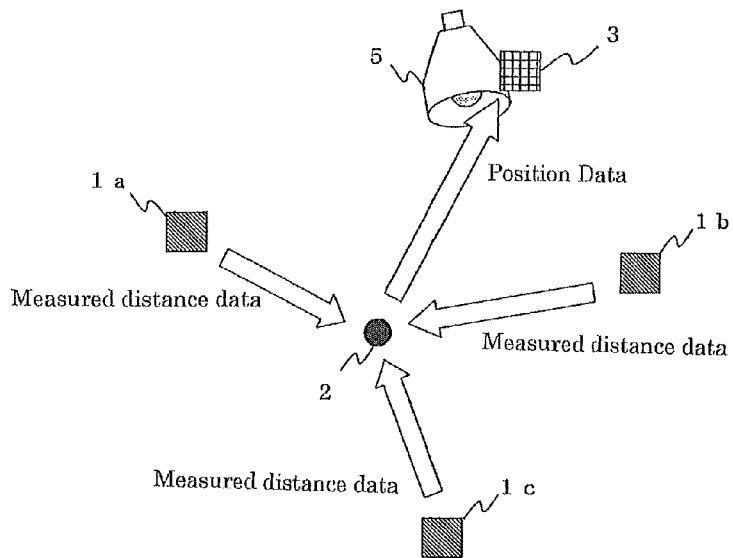
FIG. 12 is a configuration diagram of the lighting system according to Embodiment 11.

FIG. 12 is a configuration diagram of the lighting system according to Embodiment 11.

In FIG. 12, wireless base stations 1a to 1c measure each distance to the terminal 2 to be measured respectively to transmit measured distance data to the terminal 2 to be measured.

The terminal 2 to be measured calculates the position of the terminal 2 to be measured based on each measured distance data and position information of each wireless base station 1a to 1c to transmit the position data to the wireless communication part 3.

Thereafter, like Embodiment 9, the lighting instrument 5 provides the lighting.

As for other configurations and the like, they are the same as Embodiment 9.

As mentioned above, according to Embodiment 11, since the terminal 2 to be measured calculates a self position, a calculation load of the operation part of the lighting instrument 5 is reduced and the lighting instrument 5 can be configured at a lower cost compared with Embodiment 9.

In addition, unlike Embodiment 9, since specifications of each wireless base station can be made to be the same, there is no need for considering the distance to the wireless communication part 3 and position regarding the disposition of each wireless base station, so that it is advantageous from the respect of a simple installation and the like.

Embodiment 12

In Embodiments 9 to 11, descriptions are given that the position of the terminal 2 to be measured is calculated and a lighting direction is automatically adjusted, however, in the control of the lighting instrument, it is conceivable to control a set value of the luminous intensity and the like besides adjusting the lighting direction.

In Embodiment 12, descriptions will be given to the control except such a lighting direction adjustment.

In addition, the configuration of each equipment is almost the same as described in Embodiments 9 to 11, so that in Embodiment 12, different configurations from the above will be mainly explained.

Firstly, descriptions will be given to a configuration in which control information of the lighting instrument 5 is transmitted by the terminal 2 to be measured.

The terminal 2 to be measured transmits control information (command on set values of the luminous intensity and the like) on the lighting instrument 5 to the lighting instrument 5. The lighting instrument 5 performs a lighting operation in accordance with the content of the control information toward the position of the terminal 2 to be measured.

Control information may be transmitted directly from the terminal 2 to be measured to the lighting instrument 5 (wireless communication part 3) or through any of wireless base stations 1a to 1c. Thereby, if a communication method and communication means are employed for transmitting and receiving the measured distance data and the position data, no communication part is newly required for transmitting and receiving control information, so that it is convenient.

Which communication method or communication means is used may be appropriately selected in accordance with the configuration and the like of each equipment explained in Embodiments 9 to 11

Next, descriptions will be given to a configuration for adjusting the luminous intensity at the position of the terminal 2 to be measured. Two kinds of configurations (1) and (2) are conceivable as follows. Descriptions will be omitted for operations to transmit and receive control information in each case because they are the same as the control of the air-conditioner explained in Embodiment 8.

(1) A configuration in which the lighting instrument 5 has a luminous intensity sensor (2) A configuration in which the terminal 2 to be measured has a luminous intensity sensor In the above mentioned (1) and (2), when transmitting setting luminous intensity command data and luminous intensity measurement results from the terminal 2 to be measured, they may be transmitted directly from the terminal 2 to be measured to the lighting instrument 5 (wireless communication part 3) or through any of wireless base stations 1a to 1c.

Which communication method or communication means is used may be appropriately selected in accordance with the configuration and the like of each equipment in Embodiments 9 to 11

In Embodiment 12, it is explained that control information is transmitted from the terminal 2 to be measured, however, a configuration is possible in which control information is transmitted to the lighting instrument 5 by other means and a lighting operation in accordance with the content of the control information is provided at the position of the terminal 2 to be measured.

As mentioned above, according to Embodiment 12, the position of the terminal 2 to be measured is calculated based on distance data measured by the wireless base stations 1a to 1c and a lighting operation can be provided in accordance with the content of the control information toward the position based on the control information specified by the user.

In Embodiment 12, with a configuration in which the lighting instrument 5 is provided with a luminous intensity sensor, a luminous intensity adjusting function can be provided toward the position of the terminal 2 to be measured.

In Embodiment 12, a configuration in which the terminal 2 to be measured is provided with a luminous intensity sensor, a luminous intensity adjusting function can be provided toward the position of the terminal 2 to be measured as well. Further, there is no need for installing the luminous intensity sensor in the lighting instrument 5, the lighting instrument 5 can be configured at a lower cost.

Embodiment 13

In Embodiment 13, descriptions will be given to an air-conditioning system provided with a gateway device. The gateway device is an instrument that is connected with a network for air-conditioning and installed for the purpose of performing a remote control of the air-conditioner through the network.

In the following, descriptions will be given to a configuration in which the position of the terminal 2 to be measured is identified and an operation control of the air-conditioner is performed by the gateway device.

Figure 13:
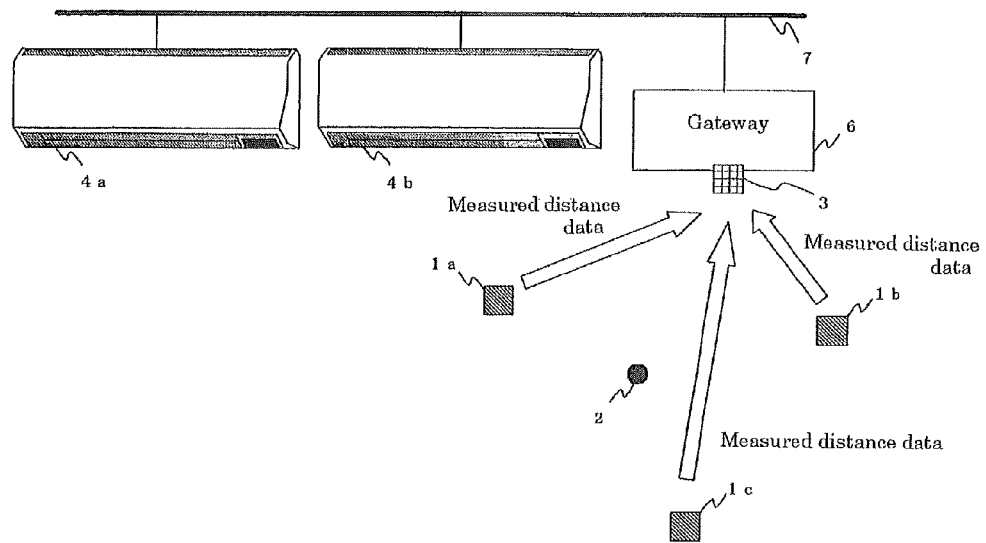
FIG. 13 is a configuration diagram of the air-conditioning system according to Embodiment 13.

FIG. 13 is a configuration diagram of the air-conditioning system according to Embodiment 13.

In FIG. 13, the wireless base stations 1a to 1c and the wireless communication part 3 have the same functions as what is explained in Embodiment 5.

The disposition of the wireless base stations 1a to 1c may be what is explained in Embodiments 1 to 4 or else may be disposed in such a way that position identification of the terminal 2 to be measured is possible.

The gateway 6 is connected with the network for air-conditioning to control the operation of air-conditioners 4a to 4b connected therewith. The gateway 6 is provided with the wireless communication part 3 and can perform wireless communication with the wireless base stations 1a to 1c. Further, it is provided with an operation part such as a CPU and microcomputer for calculating the position of the terminal 2 to be measured.

The air-conditioners 4a to 4b and gateway 6 are appropriately provided with an interface communicable through the network 7 for air-conditioning. As for a communication method, what is suitable is appropriately employed.

Next, descriptions will be given to a procedure of how the gateway 6 controls the operation of the air-conditioners 4a and 4b. The control procedure is roughly the same as Embodiment 5, however, it is different from Embodiment 5 in that the gateway 6 performs control and a plurality of air-conditioners exists, and the like.

The wireless base stations 1a to 1c measure each distance to the terminal 2 to be measured respectively to transmit measured distance data to the wireless communication part 3.

The wireless communication part 3 receives the measured distance data transmitted by the wireless base stations 1a to 1c to deliver them to an operation part built-in in the gateway 6.

The operation part calculates the position of the terminal 2 to be measured based on the received measured distance data and position information of each wireless base station 1a to 1c.

Next, the gateway 6 controls air-conditioners 4a and 4b so that a wind direction is adjusted toward the position of the terminal 2 to be measured obtained by the operation part.

When elaborating on an example of the control operation of the air-conditioners 4a to 4b by the gateway 6, followings are obtained for example.

(1) The position of each air-conditioner is pre-stored in a storage provided with the gateway 6.

(2) Next, the gateway 6 adjusts the wind direction of the air-conditioner toward the terminal 2 to be measured.

(3) The gateway 6 identifies the nearest air-conditioner to the position of the terminal 2 to be measured at first.

Above (1) to (3) are an example of the control operation and it is not necessarily required to control the air-conditioner nearest to the position of the terminal 2 to be measured, so that a suitable control may be performed in accordance with a position relation of the terminal 2 to be measured and air-conditioners 4a and 4b.

In addition, when other terminal to be measured is installed or built-in in the air-conditioners 4a and 4b, since the position of each air-conditioner can be positioned by the wireless base station, it is not necessary to store the position of each air-conditioner in the gateway 6.

The terminal to be measured corresponds to a "second terminal to be measured" in Embodiment 13.

In Embodiment 13, descriptions are given to a configuration in which two air-conditioners are connected to the network 7 for air-conditioning, however, the number of the air-conditioner is not limited thereto. As for the following Embodiments, it is the same.

As mentioned above, according to Embodiment 13, since the gateway 6 can control the operation of the air-conditioners 4a and 4b toward the position of the terminal 2 to be measured, a remote control through the gateway 6 and a collective control of a plurality of air-conditioners can be achieved.

By installing or making built-in other terminal to be measured in the air-conditioners 4a and 4b, it is possible to save time and effort to make the position of each air-conditioner stored in the gateway 6, and to arbitrarily change the position of the air-conditioner after installation, so that flexibility is enhanced of the configuration of the air-conditioning system.

Embodiment 14

In Embodiment 13, descriptions are given to calculate the position of the terminal 2 to be measured to automatically adjust the wind direction, however, it is conceivable to control a cooling/heating operation mode, wind force, and humidity besides a wind direction adjustment when controlling the air-conditioner.

In Embodiment 14, a control besides such a wind direction adjustment will be explained.

In addition, the configuration of each equipment is almost the same as described in Embodiments 13, so that in Embodiment 14, different configurations from the above will be mainly explained.

In Embodiment 14, it is provided that users operate the terminal 2 to be measured to set temperature, wind force, and the like to transmit the control information.

In the descriptions below, from the viewpoint of a simple explanation, only a setting temperature is adopted as a control object of the air-conditioner and a configuration and operation example for performing a temperature control will be described.

With regard to a place where a temperature sensor is installed and an operation subject of the temperature control, six configuration examples are conceivable as follows for example. Descriptions will be given to each configuration example as follows.

Configuration Example 1

The air-conditioner is provided with a temperature sensor and the gateway 6 performs a temperature control.

Configuration Example 2

The air-conditioner is provided with a temperature sensor, the gateway 6 notifies the air-conditioner only of a command value of the temperature setting, and the air-conditioner itself performs a temperature control.

Configuration Example 3

The terminal 2 to be measured is provided with a temperature sensor and the gateway 6 performs a temperature control.

Configuration Example 4

The terminal 2 to be measured is provided with a temperature sensor, its measurement result is transmitted through the air-conditioner to a gateway and the gateway 6 performs a temperature control.

Configuration Example 5

The gateway 6 is provided with a temperature sensor and the gateway 6 performs a temperature control.

Configuration Example 6

The gateway 6 is provided with a temperature sensor, the gateway 6 notifies the air-conditioner of a command value of the temperature setting and a measured value, and the air-conditioner itself performs a temperature control.

Regarding (Configuration Example 1)

When the air-conditioners 4a and 4b are provided with a temperature sensor such as an infrared temperature sensor and the like having a moving function, operation control is performed as follows.

The gateway 6 calculates the position of the terminal 2 to be measured according to a method explained in embodiments 5 to 7 to notify the air-conditioners 4a and 4b of the position.

The terminal 2 to be measured transmits setting temperature command data to the gateway 6 as control information.

The air-conditioners 4a and 4b measure a temperature at the position of the terminal 2 to be measured by the above-mentioned temperature sensor to notify the gateway 6 of measurement results.

The gateway 6 controls each operation part of the air-conditioners 4a and 4b to perform temperature adjustment so that the position of the terminal 2 to be measured becomes a set temperature. Which air-conditioner is controlled is appropriately determined in accordance with such as an installation environment as explained in Embodiment 13.

Regarding (Configuration Example 2)

It is the same as (Configuration example 1) up to where the air-conditioners 4a and 4b notify the gateway 6 of measurement results.

The gateway 6 notifies the air-conditioners 4a and 4b of a set temperature, so that the position of the terminal 2 to be measured becomes the set temperature. The air-conditioners 4a and 4b themselves control each operation part to perform temperature adjustment. To which air-conditioner the set temperature is notified is the same as (Configuration example 1).

Regarding (Configuration Example 3)

When the terminal 2 to be measured has a temperature sensor, operation control is performed as follows.

The gateway 6 calculates the position of the terminal 2 to be measured using a method explained in Embodiments 5 to 7.

The terminal 2 to be measured transmits the set temperature command data as control information to the gateway 6.

In addition, the terminal 2 to be measured transmits a measurement result of the temperature sensor to the gateway 6 on a regular basis.

The gateway 6 performs temperature adjustment by controlling each operation part of the air-conditioners 4a and 4b so that the position of the terminal 2 to be measured becomes the set temperature based on a difference between the setting temperature command received from the terminal 2 to be measured and the measurement result of the temperature sensor. Which air-conditioner is controlled is the same as (Configuration example 1).

Regarding (Configuration Example 4)

The gateway 6 calculates the position of the terminal 2 to be measured using a method explained in Embodiments 5 to 7.

The terminal 2 to be measured transmits the set temperature command data as control information to the gateway 6.

In addition, the terminal 2 to be measured transmits a measurement result of the temperature sensor to the air-conditioner on a regular basis.

The air-conditioner transmits the measurement result to the gateway 6.

The gateway 6 performs temperature adjustment by controlling each operation part of the air-conditioners 4a and 4b so that the position of the terminal 2 to be measured becomes the set temperature based on a difference between the setting temperature command received from the terminal 2 to be measured and the measurement result of the temperature sensor. Which air-conditioner is controlled is the same as (Configuration example 1).

Regarding (Configuration Example 5)

When the gateway 6 is provided with a temperature sensor such as an infrared temperature sensor having a moving function, operation control is performed as follows.

The gateway 6 calculates the position of the terminal 2 to be measured using a method explained in Embodiments 5 to 7.

The terminal 2 to be measured transmits the setting temperature command data as control information to the gateway 6.

The gateway 6 measures the temperature of the position of the terminal 2 to be measured by the above-mentioned sensor.

The gateway 6 performs temperature adjustment by controlling each operation part of the air-conditioners 4a and 4b so that the position of the terminal 2 to be measured becomes the set temperature based on a difference between the setting temperature command received from the terminal 2 to be measured and the measurement result of the temperature sensor. Which air-conditioner is controlled is the same as (Configuration example 1).

Regarding (Configuration Example 6)

It is the same as (Configuration example 5) up to where the gateway 6 measures a temperature.

The gateway 6 notifies the air-conditioners 4a and 4b of a set temperature and a measurement value, so that the position of the terminal 2 to be measured becomes the set temperature. The air-conditioners 4a and 4b themselves perform temperature adjustment by controlling each operation part. To which air-conditioner the set temperature is notified is the same as (Configuration example 1).

In the above (Configuration example 1) to (Configuration example 6), the terminal 2 to be measured may transmit setting temperature command data directly to the gateway 6 or may be configured to transmit them through the air-conditioner 4a or 4b.

In the latter case, the air-conditioner 4a or 4b transmits a set value of the temperature to the gateway 6, and thereafter operation control is performed explained in each configuration example.

In Embodiment 14, descriptions are given to transmitting control information from the terminal 2 to be measured, however, such a configuration is allowable in which control information is transmitted by other means and an air-conditioning operation in accordance with the content of the control information is provided with the position of the terminal 2 to be measured.

Only an example of the temperature sensor is explained in the above, however, such a configuration is possible in which the air-conditioner is controlled based on measurement results of a sensor measuring other physical quantities such as a humidity sensor to adjust the air-conditioner.

As mentioned above, according to Embodiment 14, it is possible to provide a temperature sensor for measuring the temperature of the position of the terminal 2 to be measured to adjust the temperature of the position from the gateway 6.

According to Embodiment 14, it is possible for the gateway 6 to remotely collectively control a plurality of air-conditioners based on a measurement result of the temperature.

For example, when the position of the terminal 2 to be measured is a halfway point of the air-conditioners 4a and 4b, and when either air-conditioner does not reach the temperature set to the terminal 2, it is possible to make it approach the temperature set to the terminal 2 by operating both air-conditioners.

Thereby, a control amount of each air conditioner may be the same for all air-conditioners, or the control may be focused on part of the air-conditioners.

Embodiment 15

In the above Embodiments 13 and 14, when there is a plurality of terminals 2 to be measured, the gateway 6 or the air-conditioner 4 discriminates an area where the terminals 2 to be measured exist, and performs control according to the set temperature information that a user set using the terminals 2 to be measured.

In addition, when a plurality of different temperature command values are set by a plurality of terminals 2 to be measured for one air-conditioner 4, a command value is decided by a majority vote or by taking an mean value of the terminal 2 to be measured existing in a controllable area.

Based on the above decision, one air-conditioner 4 performs air-conditioning of the relevant area.

Embodiment 16

In the above Embodiments 13 to 15, descriptions are given to that the gateway 6 calculates the position of the terminal 2 to be measured, however, as explained in Embodiments 6 and 7, it may be configured that the wireless base stations 1a to 1c and the terminal 2 to be measured calculate the position of the terminal 2 to be measured.

Thereby, each equipment is appropriately provided with a necessary configuration as explained in Embodiments 6 and 7.

Embodiment 17

In Embodiment 17, descriptions will be given to a lighting system provided with a gateway device. In the following, the position of the terminal 2 to be measured is identified and a configuration to perform operation control of the lighting instrument by the gateway device is explained.

Figure 14:
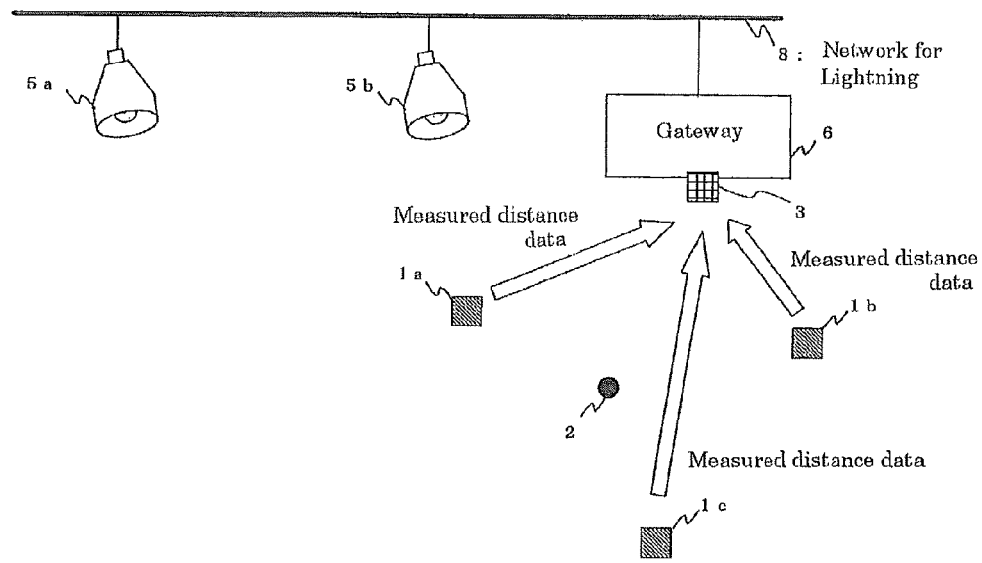
FIG. 14 is a configuration diagram of the lighting system according to Embodiment 17.

In FIG. 14, the wireless base stations 1a to 1c and the wireless communication part 3 are provided with the same functions as explained in Embodiment 9.

The disposition of wireless base stations 1a to 1c may be what is explained in Embodiments 1 to 4, or a disposition may be used in which position identification of the terminal 2 to be measured is possible.

The gateway 6 is connected with the network 8 for lighting to control operation of lighting instruments 5a and 5b connected therewith. The gateway 6 is provided with the wireless communication part 3 and can perform wireless communication with the wireless base stations 1a to 1c. Further, it is provided with an operation part such as a CPU and microcomputer for calculating the position of the terminal 2 to be measured.

The lighting instruments 5a and 5b and gateway 6 are appropriately provided with an interface communicable through the network 8 for lighting. As for a communication method, what is suitable is appropriately employed.

Next, descriptions will be given to a procedure how the gateway 6 controls the operation of the lighting instruments 5a and 5b. The control procedure is roughly the same as Embodiment 9, however, it is different from Embodiment 9 in that the gateway 6 performs control and a plurality of lighting instruments exists, and the like.

The wireless base stations 1a to 1c measure each distance to the terminal 2 to be measured respectively to transmit measured distance data to the wireless communication part 3.

The wireless communication part 3 receives the measured distance data transmitted by the wireless base stations 1a to 1c to deliver them to an operation part built-in in the gateway 6.

The operation part calculates the position of the terminal 2 to be measured based on the received measured distance data and position information of each wireless base station 1a to 1c.

Next, the gateway 6 controls the lighting instruments 5a and 5b so that a lighting direction is adjusted toward the position of the terminal 2 to be measured obtained by the operation part.

When elaborating on an example of the control operation of the lighting instruments 5a and 5b by the gateway 6, followings are obtained for example.

(1) The position of each lighting instrument is pre-stored in a storage provided with the gateway 6.

(2) Next, the gateway 6 adjusts the lighting direction of the lighting instrument toward the terminal 2 to be measured.

(3) The gateway 6 identifies the nearest lighting instrument to the position of the terminal 2 to be measured at first.

Above (1) to (3) are an example of the control operation and it is not necessarily required to control the lighting instrument nearest to the position of the terminal 2 to be measured, so that a suitable control may be performed in accordance with a position relation of the terminal 2 to be measured and lighting instruments 5a and 5b.

In addition, when other terminal to be measured is installed or built-in in the lighting instruments 5a and 5b, since the position of each lighting instrument can be positioned by a wireless base station, it is not necessary to store the position of each lighting instrument in the gateway 6.

The terminal to be measured corresponds to a "second terminal to be measured" in Embodiment 17.

In Embodiment 17, descriptions are given to a configuration in which two lighting instruments are connected to the network 8 for lighting, however, the number of the lighting instrument is not limited thereto. As for the following Embodiments, it is the same.

As mentioned above, according to Embodiment 17, since the gateway 6 can control the operation of the lighting instruments 5a and 5b toward the position of the terminal 2 to be measured, a remote control through the gateway 6 and a collective control of a plurality of lighting instruments can be achieved.

By installing or making built-in other terminal to be measured in the lighting instruments 5a and 5b, it is possible to save time and effort to make the position of each lighting instrument stored in the gateway 6 and to arbitrarily change the position of the lighting instrument after installation, so that flexibility of the configuration of the lighting instrument system is enhanced.

Embodiment 18

In Embodiment 17, descriptions are given to calculate the position of the terminal 2 to be measured to automatically adjust the lighting direction, however, it is conceivable to control such as a luminous intensity besides lighting direction adjustment when controlling the lighting instrument.

In Embodiment 18, a control besides such lighting direction adjustment will be explained.

In addition, the configuration of each equipment is almost the same as described in Embodiments 17, so that in Embodiment 18, different configurations from the above will be mainly explained.

In Embodiment 18, it is provided that users operate the terminal 2 to be measured to set a luminous intensity and the like to transmit the control information.

In the descriptions below, from the viewpoint of a simple explanation, only a luminous intensity is adopted as a control object of the lighting instrument and a configuration and operation example for performing a lighting control will be described.

With regard to a place where a luminous intensity sensor is installed and an operation subject of the temperature control, six configuration examples are conceivable as follows for example. Descriptions will be given to each configuration example as follows.

Configuration Example 1

The lighting instrument is provided with a luminous intensity sensor and the gateway 6 performs a lighting control.

Configuration Example 2

The lighting instrument is provided with a luminous intensity sensor, the gateway 6 notifies the lighting instrument only of a command value of the luminous intensity setting, and the lighting instrument itself performs a luminous intensity control.

Configuration Example 3

The terminal 2 to be measured is provided with a luminous intensity sensor and the gateway 6 performs a luminous intensity control.

Configuration Example 4

The terminal 2 to be measured is provided with a luminous intensity sensor, a measurement result of the sensor is transmitted through the lighting instrument to the gateway, and the gateway 6 performs a luminous intensity control.

Configuration Example 5

The gateway 6 is provided with a luminous intensity sensor and the gateway 6 performs a luminous intensity control.

Configuration Example 6

The gateway 6 is provided with a luminous intensity sensor, the gateway 6 notifies the lighting instrument of a command value of the luminous intensity setting and a measured value of the sensor, and the lighting instrument itself performs a luminous intensity control.

Regarding (Configuration Example 1)

When the lighting instruments 5a and 5b are provided with a luminous intensity sensor having a function capable of changing a measurement direction of such as a moving function, operation control is performed as follows.

The gateway 6 calculates the position of the terminal 2 to be measured according to a method explained in Embodiments 9 to 11 to notify the lighting instruments 5a and 5b of the position.

The terminal 2 to be measured transmits setting luminous intensity command data to the gateway 6 as control information.

The lighting instruments 5a and 5b measure the luminous intensity at the position of the terminal 2 to be measured by the above-mentioned luminous intensity sensor to notify the gateway 6 of measurement results.

The gateway 6 controls each operation part of the lighting instruments 5a and 5b to perform luminous intensity adjustment so that the position of the terminal 2 to be measured becomes a set luminous intensity. Which lighting instrument is controlled is appropriately determined in accordance with such as an installation environment as explained in Embodiment 17.

Regarding (Configuration Example 2)

It is the same as (Configuration example 1) up to where the lighting instruments 5a and 5b notify the gateway 6 of measurement results.

The gateway 6 notifies the lighting instruments 5a and 5b of a set luminous intensity, so that the position of the terminal 2 to be measured becomes a set luminous intensity. The lighting instruments 5a and 5b themselves control each operation part to perform luminous intensity adjustment. To which lighting instrument the set luminous intensity is notified is the same as (Configuration example 1).

Regarding (Configuration Example 3)

When the terminal 2 to be measured has a luminous intensity sensor, operation control is performed as follows.

The gateway 6 calculates the position of the terminal 2 to be measured using a method explained in Embodiments 9 to 11.

The terminal 2 to be measured transmits the set luminous intensity command data as control information to the gateway 6.

In addition, the terminal 2 to be measured transmits a measurement result of the luminous intensity sensor to the gateway 6 on a regular basis.

The gateway 6 performs luminous intensity adjustment by controlling each operation part of the lighting instruments 5a and 5b so that the position of the terminal 2 to be measured becomes the set luminous intensity based on the difference between the setting luminous intensity command received from the terminal 2 to be measured and the measurement result of the luminous intensity sensor. Which lighting instrument is controlled is the same as (Configuration example 1).

Regarding (Configuration Example 4)

The gateway 6 calculates the position of the terminal 2 to be measured using a method explained in Embodiments 9 to 11.

The terminal 2 to be measured transmits the set luminous intensity command data as control information to the gateway 6.

In addition, the terminal 2 to be measured transmits a measurement result of the luminous intensity sensor to the lighting instrument on a regular basis.

The lighting instrument transmits the measurement result to the gateway 6.

The gateway 6 performs luminous intensity adjustment by controlling each operation part of the lighting instruments 5a and 5b so that the position of the terminal 2 to be measured becomes a set luminous intensity based on the difference between the setting luminous intensity command received from the terminal 2 to be measured and the measurement result of the luminous intensity sensor. Which lighting instrument is controlled is the same as (Configuration example 1).

Regarding (Configuration Example 5)

When the gateway 6 is provided with a luminous intensity sensor having a function capable of changing a measurement direction of such as a moving function, operation control is performed as follows.

The gateway 6 calculates the position of the terminal 2 to be measured using a method explained in Embodiments 9 to 11.

The terminal 2 to be measured transmits the set luminous intensity command data as control information to the gateway 6.

The gateway 6 measures a luminous intensity of the position of the terminal 2 to be measured by the above-mentioned sensor.

The gateway 6 performs luminous intensity adjustment by controlling each operation part of the lighting instruments 5a and 5b so that the position of the terminal 2 to be measured becomes a set luminous intensity based on the difference between the setting luminous intensity command received from the terminal 2 to be measured and the measurement result of the luminous intensity sensor. Which lighting instrument is controlled is the same as (Configuration example 1).

Regarding (Configuration Example 6)

It is the same as (Configuration example 5) up to where the gateway 6 measures a luminous intensity.

The gateway 6 notifies the lighting instruments 5a and 5b of a set luminous intensity and a measurement value, so that the position of the terminal 2 to be measured becomes the set luminous intensity. The lighting instruments 5a and 5b perform luminous intensity adjustment by controlling each operation part themselves. To which lighting instrument the set luminous intensity is notified is the same as (Configuration example 1).

In the above (Configuration example 1) to (Configuration example 6), the terminal 2 to be measured may transmit set luminous intensity command data directly to the gateway 6 or may be configured to transmit them through the lighting instruments 5a and 5b.

In the latter case, the lighting instruments 5a or 5b transmits a set value of the luminous intensity to the gateway 6, and thereafter operation control is performed explained in each configuration example.

In Embodiment 18, descriptions are given to transmitting control information from the terminal 2 to be measured, however, such a configuration is allowable in which control information is transmitted by other means and a lighting operation in accordance with the content of the control information is provided with the position of the terminal 2 to be measured.

Only an example of the luminous intensity sensor is explained in the above, however, such a configuration is possible in which the lighting instrument is controlled based on measurement results of a sensor measuring other physical quantities.

As mentioned above, according to Embodiment 18, it is possible to provide a luminous intensity sensor for measuring the luminous intensity of the position of the terminal 2 to be measured to adjust the luminous intensity of the position from the gateway 6.

According to Embodiment 18, it is possible for the gateway 6 to remotely collectively control a plurality of air-conditioners based on measurement result of the luminous intensity.

For example, when the position of the terminal 2 to be measured is a halfway point of the lighting instruments 5a and 5b, and when either lighting instrument does not reach the luminous intensity set to the terminal 2 to be measured, it is possible to make it approach the set luminous intensity by the terminal 2 to be measured by operating both lighting instruments.

Thereby, a control amount of each lighting instrument may be the same for all lighting instruments, or the control may be focused on part of the lighting instruments.

Embodiment 19

In the above Embodiments 17 and 18, when there is a plurality of terminals 2 to be measured, the gateway 6 or the lighting instrument 5 discriminates an area where the terminals 2 to be measured exist, and performs control according to the set luminous intensity information that a user set using the terminal 2 to be measured.

In addition, when a plurality of different luminous intensity command values are set by a plurality of terminals 2 to be measured for one lighting instrument 5, a command value is decided by a majority vote or by taking a mean value of the terminals 2 to be measured existing in a controllable area.

Based on the above decision, one lighting instrument 5 performs lighting of the relevant area.

Embodiment 20

In the above Embodiments 17 to 19, descriptions are given to that the gateway 6 calculates the position of the terminal 2 to be measured, however, as explained in Embodiments 10 and 11, it may be configured that the wireless base stations 1*a* to 1*c* and the terminal 2 to be measured calculate the position of the terminal 2 to be measured.

Thereby, each equipment is appropriately provided with a necessary configuration as explained in Embodiments 10 and 11.

Embodiment 21

In general, the wireless base station 1 assigns an address to the terminal 2 to be measured participating the following wireless network to manage the address of each terminal 2 to be measured by such as a management table.

In the above Embodiments 1 to 20, no mention in particular about how to assign the address of the terminal 2 to be measured, that is an address system, although, it is preferable form the viewpoint of management afterwards that the address of the terminal 2 to be measured be assigned according to some kind of a regularity.

Therefore, in the positioning system according to Embodiment 21 of the present invention, descriptions will be given to a method in which the address of the terminal 2 to be measured is regularly assigned.

As for a simplest method for assigning the address of the terminal 2 to be measured, a method is conceivable in which an address value is assigned by increasing one at a time in order from the terminal 2 to be measured participated in the following network.

However, in such a method, since the address is assigned while having no relation between position coordinates of the terminal 2 to be measured and the address, the address system is nor clear and it is not necessarily preferable from the viewpoint of management.

Accordingly, in Embodiment 21, it is provided that when the wireless base station 1 obtains position coordinates of the terminal 2 to be measured, the wireless base station 1 uses its coordinate value as address values of the terminal 2 to be measured to register them into such as a management table. Changes will be allowable as the need arises to such a degree as to convert number and to omit signs such as a comma.

The use of such a method clarifies an address system of the terminal 2 to be measured and position coordinates of the terminal 2 to be measured and the address can be grasped while maintaining a relationship, so that it is preferable from the viewpoint of management.

In addition, when employing a method for assigning the address as mentioned above, there is an assumption that an upper limit of the address value and that of coordinate value are equal, or the upper limit of the address value has to be larger.

This is because when the upper limit of coordinate value is larger than that of the address value and the coordinate value is intended to be used as an address value as it is, the address value to be set exceeds an address space.

When the upper limit of the coordinate value has to be made larger, it is possible to work out in every way not to exceed the address space using such as a hash value operation, however, it is preferable to make the upper limit of the address value larger from the viewpoint of ease of management.

As for how the wireless base station 1 obtains position coordinates of the terminal 2 to be measured, it is added that any method described in the above Embodiments can be used. Further, an address assign method explained in Embodiment 21 is applicable to the above Embodiments 1 to 20. It is the same for Embodiments in the following.

Embodiment 22

Figure 15:
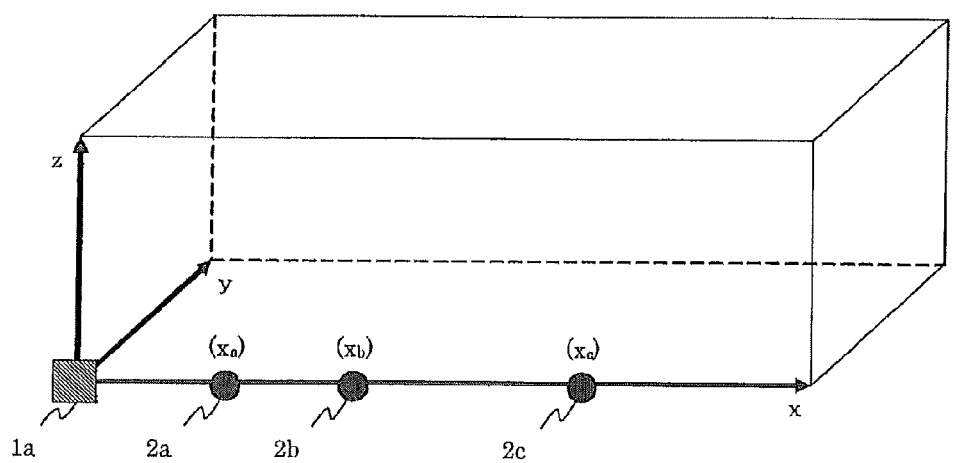
FIG. 15 shows a disposition of a base station and terminals to be measured of the positioning system according to Embodiment 22.

FIG. 15 shows a disposition of a base station and a terminal to be measured of a positioning system according to Embodiment 22 of the present invention. In FIG. 15, 2*a* to 2*c* are terminals to be measured.

When disposing the terminals 2 to be measured in a building, because of disposition, they are laid-out almost in the same straight line as shown in FIG. 15 in some case.

In such a case, the wireless base station 1*a* obtains the address of each terminal 2 to be measured as follows.

(1) The wireless base station 1*a* rotates coordinate axes with its position being an origin to specify coordinate axes in such away that all the terminals 2 to be measured be disposed on a coordinate axis straight line composed of any of X-axis, Y-axis, or Z-axis. In addition, FIG. 15 shows an example in which they are disposed on the X-axis.

(2) Next, the wireless base station 1*a* obtains one-dimensional coordinate values of each terminal 2 to be measured on the set coordinate axis to set them an address of each terminal 2 to be measured to register them in such as a management table. In the example of FIG. 15, coordinate values $(X_a)$, $(X_b)$, $(X_c)$ on the X-axis are specified as the address of each terminal to be measured.

For example, when the address space possessed by the terminal 2 to be measured is 8 bits, 255 addresses can be expressed.

When converting this into position coordinates in a real space, and when partitioning, for example, a space in a building by a resolution of a distance of 3 m to set the position of the terminal 2 to be measured, it is possible to dispose an address of the terminal 2 to be measured on a one-dimensional coordinate of 255×3 m=765 m.

In addition, when specifying a coordinate space by partitioning a space in a building in a grid-like fashion with a resolution of a distance of 3 m, it is possible that the position of the terminal 2 to be measured does not coincide with the position on the lattice point.

In such a case, the nearest lattice point to the position of the terminal 2 to be measured may be specified as coordinates of the relevant terminal 2 to be measured. It is the same for Embodiments in the following.

By the above processing, one-dimensional coordinate values of the terminal 2 to be measured are set as an address of the relevant terminal 2 to be measured as they are, so that an address system is clarified and address management is easy to be done.

In addition, when rotating a coordinate axis, the position of the wireless base station 1*a* is not always made to be an origin, but from the viewpoint of easy calculation, it is convenient when the position of the wireless base station 1*a* is made to be the origin. It is the same for Embodiments in the following.

Embodiment 23

Figure 16:
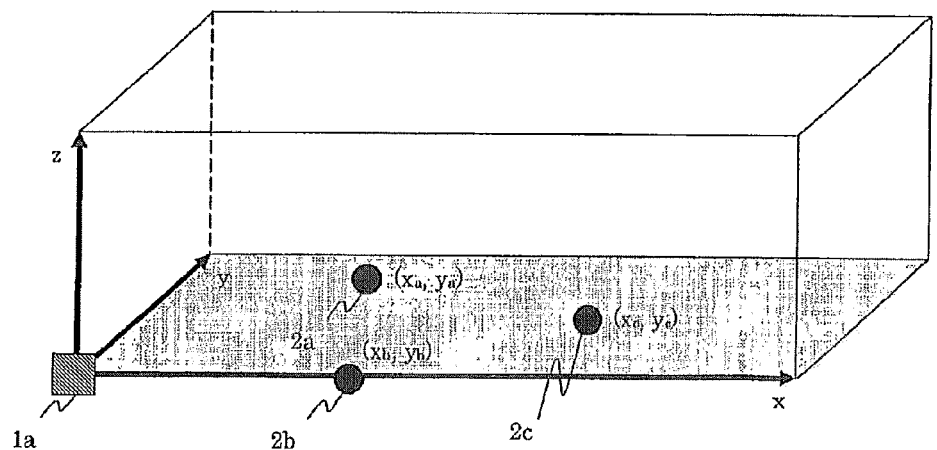
FIG. 16 shows a disposition of a base station and terminals to be measured of the positioning system according to Embodiment 23.

FIG. 16 shows a disposition of a base station and a terminal to be measured of a positioning system according to Embodiment 23 of the present invention. In FIG. 16, 2*a* to 2*c* are terminals to be measured.

When disposing the terminals 2 to be measured in a building, because of disposition, they are laid-out almost on the same plane as shown in FIG. 15 in some case.

In such a case, the wireless base station 1a specifies the address of each terminal 2 to be measured as follows.

(1) The wireless base station 1a rotates coordinate axes with its position being an origin to specify coordinate axes in such a way that all the terminals 2 to be measured be disposed on a coordinate axis plane composed of any two of X-axis, Y-axis, or Z-axis. In addition, FIG. 16 shows an example in which they are disposed on the XY-plane.

(2) Next, the wireless base station 1a obtains two-dimensional coordinate values of each terminal 2 to be measured on the set coordinate axis to set them an address of each terminal 2 to be measured to register them in such as a management table. In the example of FIG. 16, coordinate values $(x_a, y_a)$, $(x_b, y_b)$, $(x_c, y_c)$ on the XY-plane are set as the address of each terminal to be measured.

For example, when the address space possessed by the terminal 2 to be measured is 16 bits, 8 bits are assigned to the X-axis and Y-axis, respectively and 255 addresses can be expressed for one coordinate axis.

When converting this into position coordinates in a real space, and when partitioning, for example, a space in a building by a resolution of a distance of 3 m to set the position of the terminal 2 to be measured, it is possible to dispose an address of the terminal 2 to be measured on a two-dimensional coordinate on a plane of one side 255×3 m=765 m.

By the above processing, two-dimensional coordinate values of the terminal 2 to be measured are set as an address of the relevant terminal 2 to be measured as they are, so that an address system is clarified and address management is easy to be done.

Embodiment 24

Figure 17:
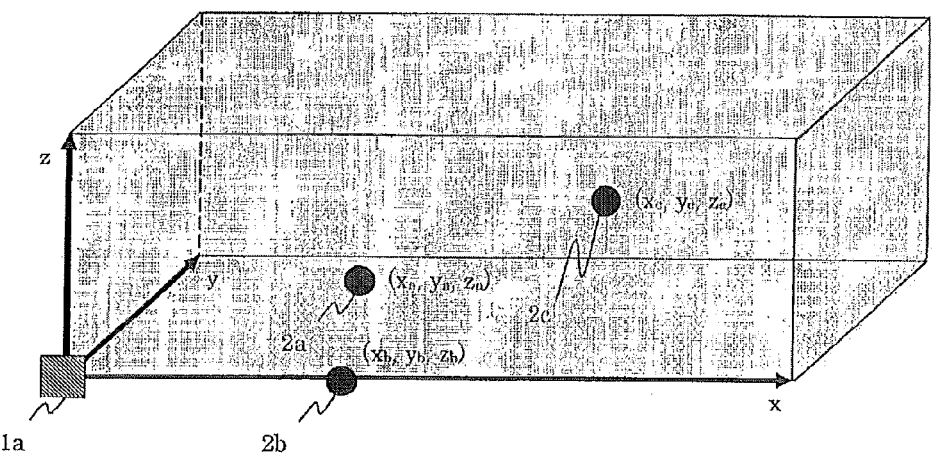
FIG. 17 shows a disposition of a base station and terminals to be measured of the positioning system according to Embodiment 24.

FIG. 17 shows a disposition of a base station and a terminal to be measured of a positioning system according to Embodiment 24 of the present invention. In FIG. 17, 2a to 2c are terminals to be measured.

The wireless base station 1a obtains three-dimension coordinate values of each terminal 2 to be measured to set an address of each terminal 2 to be measured to register in such as a management table. In the example of FIG. 17, coordinate values $(x_a, y_a, z_a)$, $(x_b, y_b, z_b)$, $(x_c, y_c, z_c)$ are set as the address of each terminal to be measured.

For example, when the address space possessed by the terminal 2 to be measured is 24 bits, 8 bits are assigned to each axis respectively and 255 addresses can be expressed per one coordinate axis.

When converting this into position coordinates in a real space, and when partitioning, for example, a space in a building by a resolution of a distance of 3 m to set the position of the terminal 2 to be measured, it is possible to dispose an address of the terminal 2 to be measured on a three-dimensional coordinate on a solid of one side of 255×3 m=765 m.

By the above processing, three-dimensional coordinate values of the terminal 2 to be measured are set as an address of the relevant terminal 2 to be measured as they are, so that an address system is clarified and address management is easy to be done.

Embodiment 25

Figure 18:
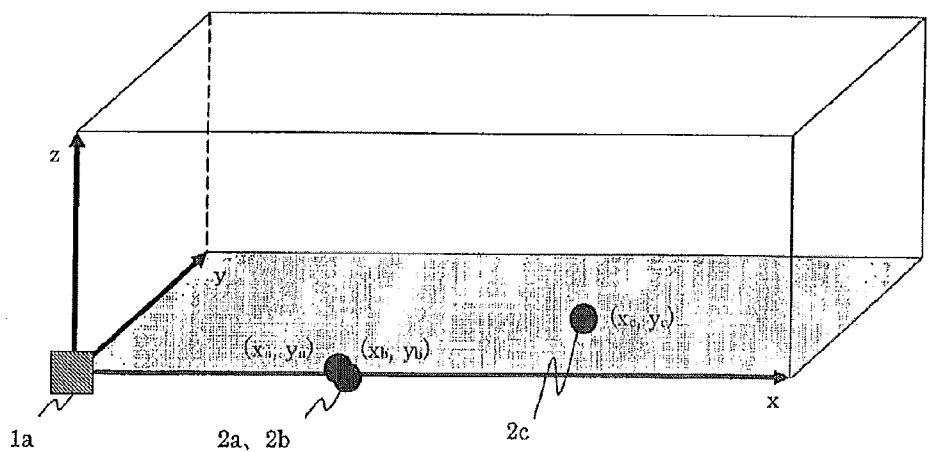
FIG. 18 shows a disposition of a base station and terminals to be measured of the positioning system according to Embodiment 25.

FIG. 18 shows a disposition of a base station and a terminal to be measured of a positioning system according to Embodiment 25 of the present invention. In FIG. 18, 2a to 2c are terminals to be measured.

In Embodiments 22 to 24, descriptions are given to an example that a space in a building is partitioned by a resolution of 3 m and the position of the terminal 2 to be measured is set. When setting coordinates by partitioning a space by a certain resolution, there is a possibility that a plurality of the terminals 2 to be measured overlap on the same coordinates.

In FIG. 18, an example is shown in which terminals 2a and 2b to be measured overlap on the same coordinates and $(x_a, y_a)=(x_b, y_b)$.

Then, in the wireless base station 1a according to Embodiment 25, an inherent value (for example, an identification number of a terminal) is provided with each terminals 2 to be measured, the address of the relevant terminal 2 to be measured is expressed by combining the inherent value and coordinate values.

The number of digits of the inherent value may be arbitrary, however, it is convenient from the viewpoint of processing to adopt 8 bits, which is the same for expressing each coordinate value.

For example, when using the one-dimensional coordinate values explained in Embodiment 22, an address is expressed by (X-coordinate 8 bits+inherent value 8 bits)=16 bits.

Thereby, terminals as many as those that can be expressed by 8 bits at the same position can be disposed in a superposed fashion.

Similarly, when employing the two-dimension coordinates explained in Embodiment 23, an address is expressed by (X-coordinate and Y-coordinate 16 bits+inherent value 8 bits)=24 bits. When employing the three-dimension coordinates explained in Embodiment 24, an address is expressed by (X-coordinate to Z-coordinate 24 bits+inherent value 8 bits)=32 bits.

By using a method for assigning an address explained in Embodiments 21 to 25, even with no address information of each terminal 2 to be measured, the wireless base station 1a and other terminals to be measured can control and monitor a certain area.

Embodiment 26

Figure 19:
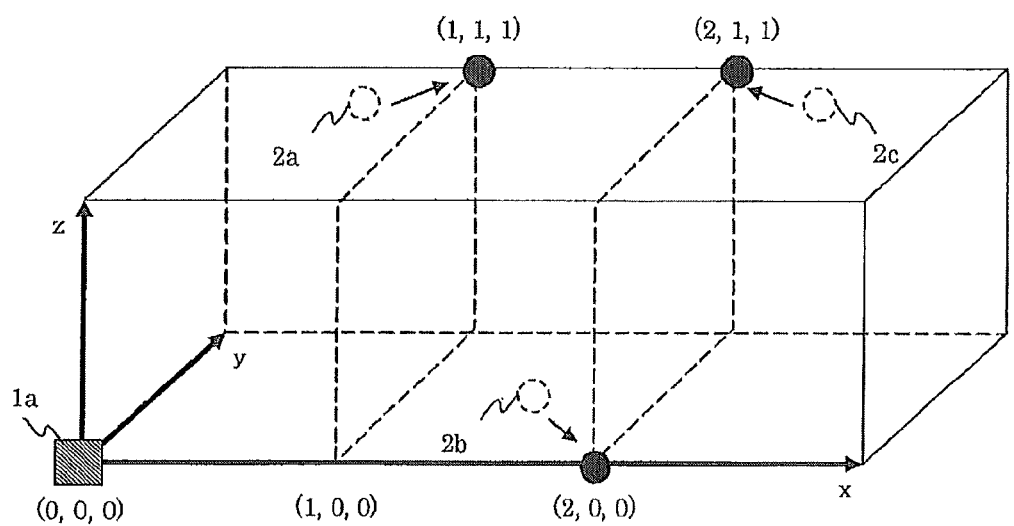
FIG. 19 shows a disposition of a base station and terminals to be measured of the positioning system according to Embodiment 26.

FIG. 19 shows a disposition of a base station and a terminal to be measured of a positioning system according to Embodiment 26 of the present invention. In FIG. 19, 2a to 2c are terminals to be measured.

When the terminal 2 to be measured is a mobile terminal, the address of the relevant terminal 2 to be measured set using the method explained in Embodiments 21 to 25 is different from an actual position of the terminal 2 to be measured as time progresses.

Therefore, in Embodiment 26, regarding the address of the mobile terminal, the address is set in accordance with a method as follows.

(1) When the wireless base station 1a sets an address of the terminal 2 to be measured for the first time, an identifier is added to the address that shows it is a mobile address. The identifier is composed of, for example, 8 bits.

(2) The terminal 2 to be measured transmits a communication telegram to the wireless base station 1a that the address of the relevant terminal 2 to be measured should be set.

(3) The wireless base station 1a sets coordinate values of the position of the terminal 2 to be measured when receiving the communication telegram as the address of the terminal 2 to be measured.

Embodiment 27

In Embodiment 26, descriptions are given that from the terminal 2 to be measured, a communication telegram is transmitted that the address of the relevant terminal 2 to be measured should be set.

Other than that, it may be configured that the coordinate values of the terminal 2 to be measured may be obtained and set as the address of the relevant terminal 2 to be measured by taking the opportunity of an external command from the wireless base station 1a such as to directly operate the wireless base station 1a or to transmit the communication telegram from other communication equipment.

Using the method explained in Embodiments 26 and 27, since by providing an identifier in an address showing that it is a mobile address, it is possible for the wireless base station 1a and other communication terminals to understand that the address does not coincide with that of the relevant terminal 2 to be measured, so that it becomes possible to remove the object terminal from the control and monitoring for a certain area.

Embodiment 28

For a moving relevant terminal 2 to be measured, an average of position data of the terminal 2 to be measured, which is measured for a certain time range at a certain time interval, may be registered as an address of the relevant terminal 2 to be measured.

When a moving range of the terminal 2 to be measured is small and the area is limited to some extent, since the area and address almost correspond, it is possible to control the area.

For example, when a person holding the terminal 2 to be measured performs an operation in an almost specified space, by identifying an address of the relevant terminal 2 to be measured, it is possible to identify the area where the holder exists and to perform an inherent control operation to the area.

As an example of the above-mentioned inherent control operation, when configuring by, combining a positioning system and air-conditioning system, or positioning system and lighting system, it is considered that the area where the holder exists is identified by the positioning system and the air-conditioning and lighting of the area is optimally operated.

The invention claimed is:

1. An air-conditioning system, comprising:
an air conditioner,
a terminal to be measured provided with a wireless communication function, and
at least three wireless base stations that transmit and receive a distance-measuring signal to and from the terminal to be measured by wireless communication, wherein
each of the wireless base stations measures a distance to the terminal to be measured and transmits measured distance data to the air-conditioner,
the air-conditioner includes an operation part that controls the air-conditioner and that calculates the position of the terminal to be measured on the basis of the measured distance data and positional information of each of the wireless base stations, and calculates a position of the terminal to be measured to adjust a wind direction to the calculated position of the terminal to be measured with the operation part,
the air-conditioner integrally includes a sensor that measures a predetermined physical quantity and that is capable of controlling a measuring direction to a desired direction,
the sensor notifies a measurement result of the sensor at the position of the terminal to be measured to the operation part,
the air-conditioner adjusts the physical quantity at the position of the terminal to be measured based on the measurement result of the sensor, and each of the at least three wireless base stations is disposed at each corner of an isosceles triangle having only two equal sides that is formed within the air-conditioned space by the air-conditioner while height from a base of the isosceles triangle to an apex thereof and length of a base of the isosceles triangle are equal to a maximum communication distance of the wireless base stations.

2. The air-conditioning system of claim 1, wherein
the wireless base station calculates a position of the terminal to be measured based on measured distance data to obtain a coordinate value thereof to set the coordinate value as an address of the terminal to be measured.

3. The air-conditioning system of claim 2, wherein
the wireless base station combines the coordinate value of the terminal to be measured and an identification number given to the terminal to be measured to set as the address of the terminal to be measured.

4. The air-conditioning system of claim 2, wherein
when a space in a building is partitioned with resolution of a predetermined distance to set a lattice coordinate space, and when the position of the terminal to be measured does not match that of a lattice point,
the wireless base station sets the coordinate value of the lattice point nearest to the terminal to be measured as the address of the terminal to be measured.

5. The air-conditioning system of claim 2, wherein
when the terminal to be measured is a mobile terminal,
the terminal to be measured transmits a signal for setting the address of the terminal to be measured to the wireless base station, and
the wireless base station obtains coordinate value of the position of the terminal to be measured to set the coordinate value as the address of the terminal to be measured when receiving the signal.

6. The air-conditioning system of claim 5, wherein
the wireless base station sets an average of coordinate values of the position of the terminal to be measured obtained at predetermined time intervals for a certain time range as the address of the terminal to be measured.

7. The air-conditioning system of claim 1, wherein
a plurality of the isosceles triangles are formed in an air-conditioning space by the air-conditioner,
each bottom side and each equal side of adjoining isosceles triangles of the isosceles triangles overlap respectively, and
each of the wireless base stations is disposed at each corner of the plurality of isosceles triangles.

8. An air-conditioning system, comprising;
an air-conditioner,
a terminal to be measured provided with a wireless communication function, and
at least three wireless base stations that transmit and receive a distance-measuring signal to and from the terminal to be measured by wireless communication, wherein
each of the wireless base stations measures a distance to the terminal to be measured and transmits measured distance data to the air-conditioner,
the air-conditioner includes an operation part that controls the air-conditioner and that calculates a position of the terminal to be measured based on the measured distance data and position information of each of the wireless base stations, and calculates a position of the terminal to be measured to adjust a wind direction to the calculated position of the terminal to be measured with the operation part, wherein the terminal to be measured has a sensor for measuring a predetermined physical quantity at the position of the terminal to be measured to notify a measurement result of the sensor to the air-conditioner, the air-conditioner adjusts the physical quantity at the position of the terminal to be measured based on a measurement result of the sensor, each of at least three wireless base stations is disposed at each corner of the isosceles triangle having only two equal sides formed within air-conditioned space by the air-conditioner while height from a base of the isosceles triangle to an apex thereof and length of the base of the isosceles triangle are equal to a maximum communication distance of the wireless base stations.

9. The air-conditioning system of claim 8, wherein
the terminal to be measured transmits the measurement result of the sensor to the air-conditioner through any one of the wireless base stations.

10. The air-conditioning system of claim 8, wherein
a plurality of the isosceles triangles are formed in an air-conditioning space by the air-conditioner, each bottom side and each equal side of adjoining isosceles triangles of the isosceles triangles overlap respectively, and each of the wireless base stations is disposed at each corner of the plurality of isosceles triangles.

* * * * *